(12) United States Patent
Müller et al.

(10) Patent No.: US 8,799,132 B2
(45) Date of Patent: Aug. 5, 2014

(54) METHOD FOR CREATING AND PRICING OPTIONS

(76) Inventors: Ulrich A. Müller, Zurich (CH); Richard B. Olsen, Zurich (CH); Jonathan Robert Buchanan, Winterthur (CH)

( * ) Notice: Subject to any disclaimer, the term of this patent is extended or adjusted under 35 U.S.C. 154(b) by 2368 days.

(21) Appl. No.: 11/706,459

(22) Filed: Feb. 14, 2007

(65) Prior Publication Data

US 2007/0143200 A1 Jun. 21, 2007

Related U.S. Application Data

(62) Division of application No. 09/717,055, filed on Nov. 21, 2000, now Pat. No. 7,212,998.

(51) Int. Cl.
*G06Q 40/00* (2012.01)
(52) U.S. Cl.
USPC ............................. 705/36 R; 705/35; 705/37
(58) Field of Classification Search
USPC .......................................... 705/35, 36 R, 37
See application file for complete search history.

(56) References Cited

U.S. PATENT DOCUMENTS 6,839,686 B1 * 1/2005 Galant ........................ 705/36 R
7,236,952 B1 * 6/2007 D'Zmura .................... 705/36 R

* cited by examiner

*Primary Examiner* — Lalita M Hamilton
(74) *Attorney, Agent, or Firm* — Ward & Zinna, LLC

(57) ABSTRACT

A preferred embodiment of the subject invention is directed to creation and pricing of an option related to a target zone in a time-price plot. If the price curve against time enters this zone (in a preferred embodiment, a "box"), a fixed amount of money is paid to the owner of the option; if the curve misses the box, there is no payout to the option owner, who also forfeits the premium paid for the option. Software is described that enables an option buyer to easily create and set the parameters of such an option, that computes a premium for the option, and that manages payout and other functions related to the option. The above-described embodiment is a buy-to-hit option. Other embodiments are directed to sell-to-hit, buy-to-miss, and sell-to-miss options.

16 Claims, 13 Drawing Sheets

METHOD FOR CREATING AND PRICING OPTIONS

CROSS-REFERENCE TO RELATED APPLICATION

This application is a divisional of prior application Ser. No. 09/717,055, filed Nov. 21, 2000, now U.S. Pat. No. 7,212,998 which is incorporated herein by reference.

FIELD OF THE INVENTION

The subject invention is directed to option creation and pricing, and more particularly to creation and pricing of options on an asset whose value over time is graphically displayed on a computer screen.

BACKGROUND

An option is a contract that gives its owner the right to buy or sell some asset at a pre-specified price. See Zvi Bodie and Robert C. Merton, Finance. 384 (2000). An option to buy the specified item at a fixed price is a call; an option to sell is a put. The buy or sell price specified in an option contract is called the option's strike price or exercise price. The date after which an option can no longer be exercised is called its expiration date or maturity date. An American-type option can be exercised at any time up to and including the expiration date. A European-type option can only be exercised on the expiration (late.

Options on stocks were first traded on an organized exchange in 1973. See John C. Hull, Options, Futures and Other Derivatives 5 (1999) (hereinafter Hull). European and American options on foreign currencies are now actively traded in both over-the-counter and exchange-traded markets. The Philadelphia Stock Exchange has been trading currency options since 1982.

Pricing formulas for call options are known. For example, the Black-Scholes-Merton formula states that the price C of a European-type call option for a stock can be calculated at any time before the option matures by the following:

$$C = SN(d_1) - Le^{-rT}N(d_1 - \sigma\sqrt{T}),$$

where S is the current price—the price at which the stock underlying the call option is trading. N(d) is the probability that a random draw from a standard normal distribution will be less than d. $d_1$ is given by the formula:

$$d_1 = \frac{\ln\left(\frac{S}{E}\right) + \left(r + \frac{\sigma^2}{2}\right)T}{\sigma\sqrt{T}}$$

where S=price of the stock; E=exercise price; r=risk-free interest rate (the annualized, continuously-compounded rate on a safe asset with the same maturity as the option); σ=the volatility of the stock-that is, the standard deviation of the annualized, continuously-compounded rate of return on the stock; T=time to maturity of the option in years; L is the exercise price—the price at which the holder has the right to buy the stock when the call option expires; and $e^{-rT}$ is a term that adjusts the exercise price, L, by taking into account the time value of money.

Other, generally more complicated, formulas exist for option pricing. The nature of the problem dictates that they depend on the probability that the price of the asset will reach a certain level in a certain period of time. This probability in turn is a function of the current asset price and the volatility (current and/or predicted) of the asset price. A high volatility increases the probability than a given asset price will be reached.

As is known to those skilled in the art, options generally and option pricing methods in particular are not user-friendly: novice investors find them arcane and intimidating, and consequently avoid using them.

There is thus a need for a user-friendly, efficient, intuitively simple type of option. Such an option should be sophisticated enough to be interesting to experienced traders, yet user-friendly enough for a novice to use. Similarly, there is a need for a method and system that allows a novice user to create and select the parameters of such an option without needing to understanding the mathematics or financial theory behind the option.

SUMMARY

A preferred embodiment of the subject invention is directed to creation and pricing of an option related to a target zone in a time-price plot. If the price curve against time enters this zone (in a preferred embodiment, a "box"), a fixed amount of money is paid to the owner of the option; if the curve misses the box, there is no payout to the option owner, who also forfeits the premium paid for the option. Software is described that enables an option buyer to easily create and set the parameters of such an option, that computes a premium for the option, and that manages payout and other functions related to the option.

The above-described embodiment is a buy-to-hit option. Other embodiments are directed to sell-to-hit, buy-to-miss, and sell-to-miss options.

The option is designed to work in an intra-day environment with high-frequency data, although those skilled in the art will recognize that it works just as well in a low-frequency environment. In an intra-day environment, issues such as daily seasonality of volatility, high-frequency volatility forecasting, and heavy-tailed return distribution functions must be considered.

DETAILED DESCRIPTION OF PREFERRED EMBODIMENTS

1. Introduction

Figure 1:
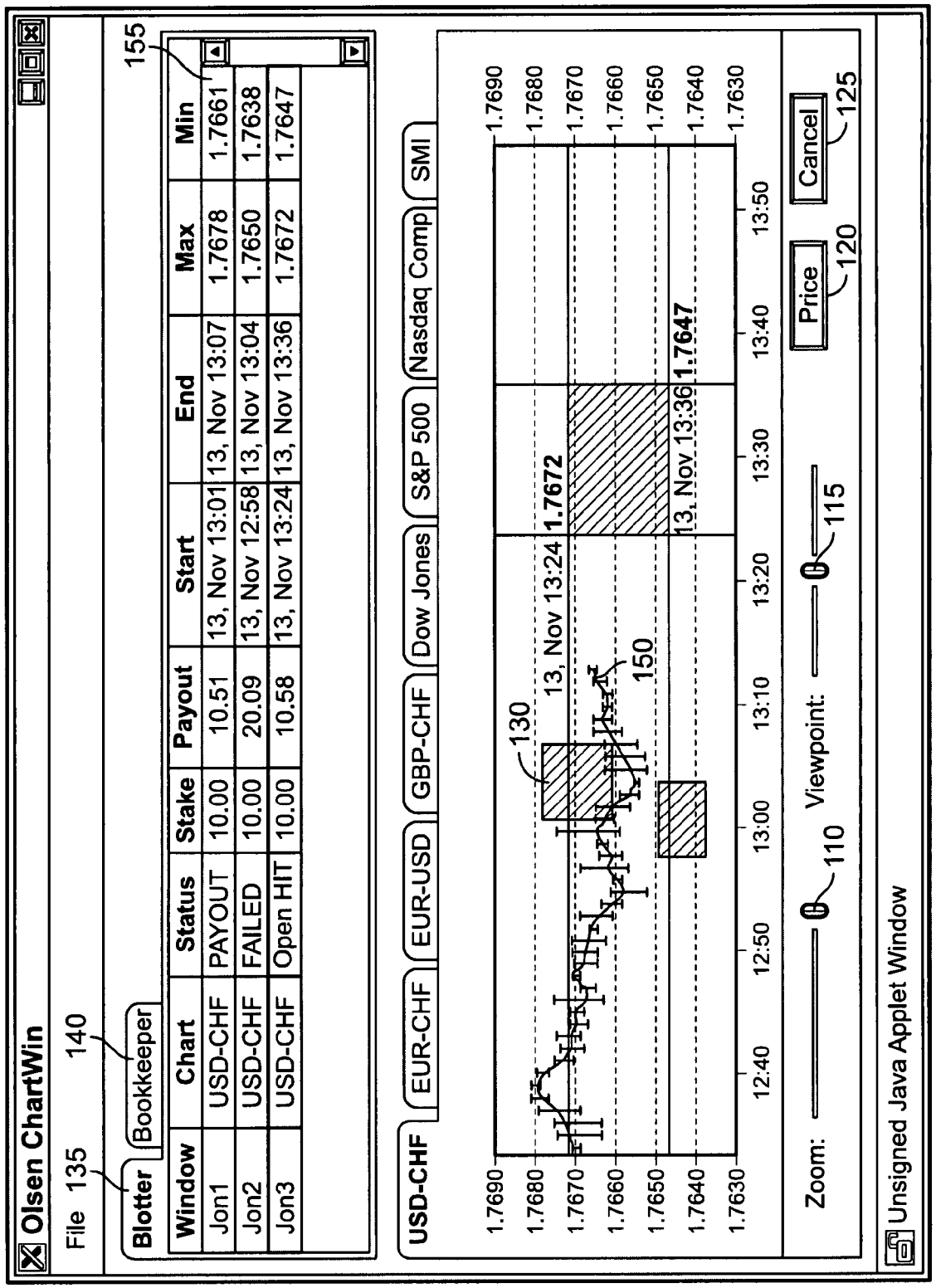
FIG. 1 depicts a box option display.

In a preferred embodiment, the options are rectangular boxes defined in a price-time plot. Such a plot is shown as the dark area in the display of FIG. 1, where price is plotted on the vertical axis and time on the horizontal axis. A box option is depicted in FIG. 1 as rectangle 130. In alternate embodiments, options have other shapes.

A preferred pricing algorithm is based on high-frequency data technology. As is true for all option types, binomial trees can be used to approximately compute option prices. However, this is not necessary in the case of rectangular box options, as will be shown below.

2. Hitting the Box

Figure 3:
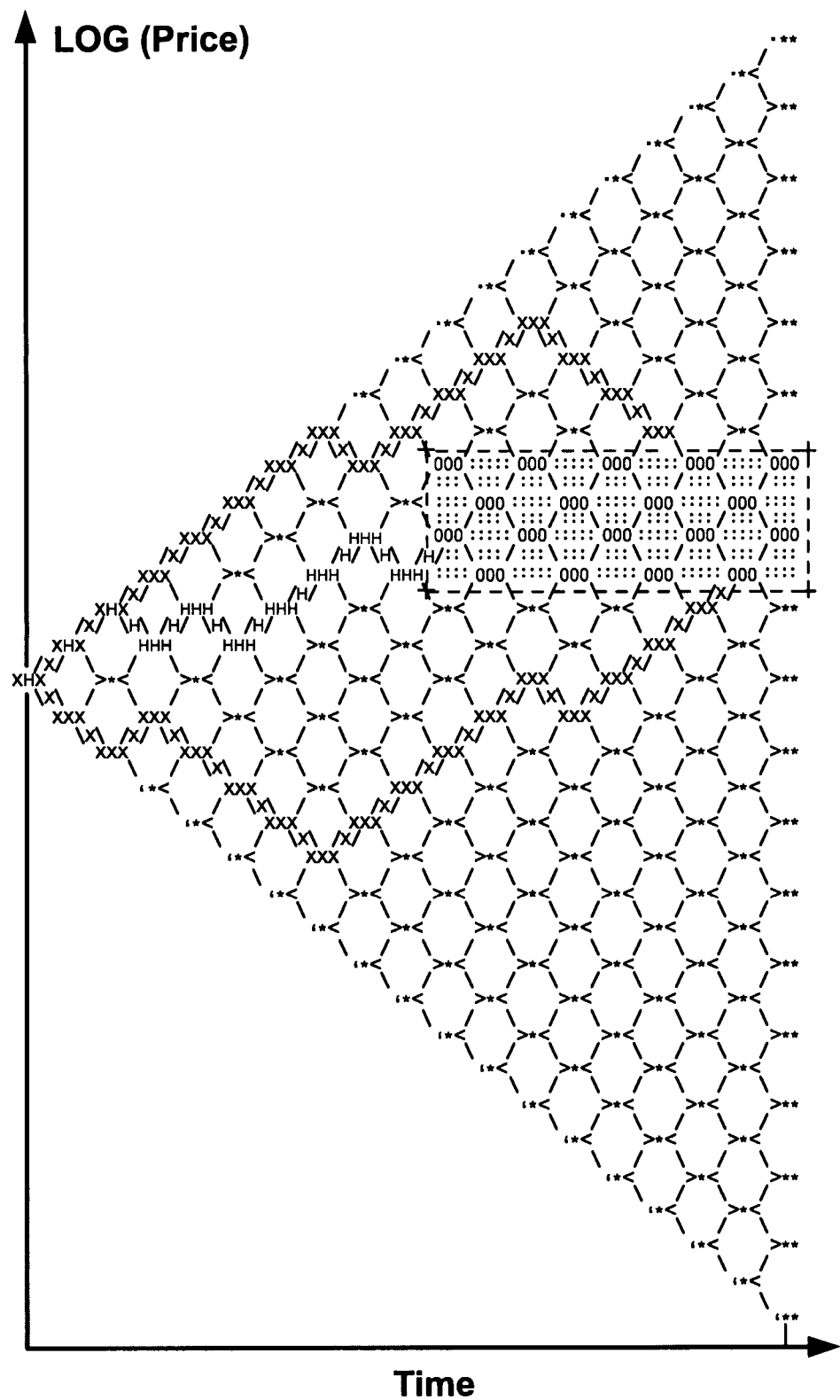
FIG. 3 depicts a box option and a binomial tree, with three price paths.
Figure 5:
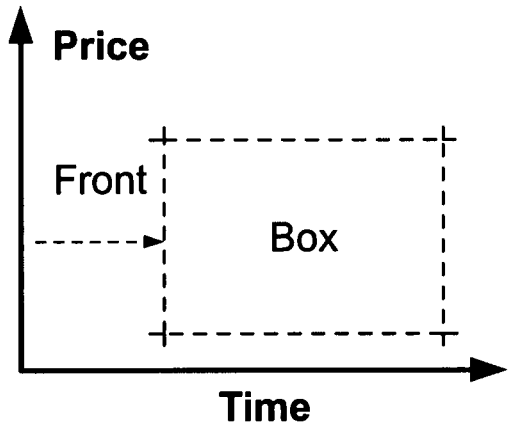
FIG. 5 depicts a box option being hit from the front.
Figure 6:
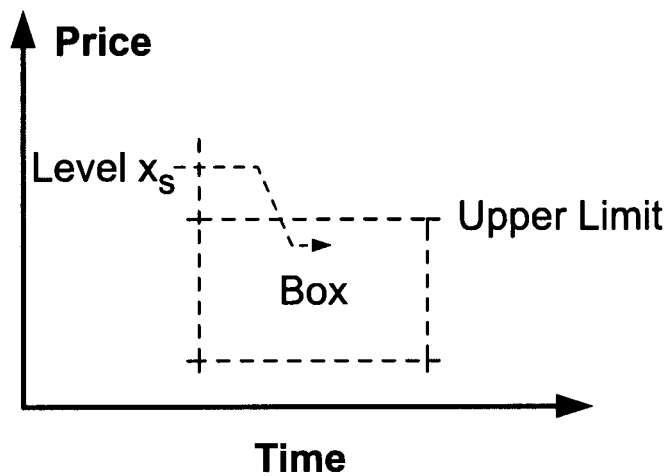
FIG. 6 depicts a box option being hit from above.

A box option can be hit in one of three ways: either at the front of the box (at its start-time) (see FIGS. 1 and 5), or from the lower (see FIG. 4) or upper side (see FIG. 6) (at a time between the start-time and end-time). This is also illustrated in FIG. 3. "Cutting a corner" counts as a hit, even if no price point actually occurs in the box.

As soon as the box is hit, the payout is due and the box option no longer exists. This is known as "early exercising" in the option pricing art. The option lasts until the end time of the box only if the price curve misses the box.

The different ways of hitting the box correspond to different pricing methods. The probability of hitting at the front is simply the integral of the probability distribution at start time, taken over the price range of the box. Computing the probability of entering through the upper or lower limit is more demanding but possible; a preferred embodiment uses a method based on Zumbach, G. O., Considering Time as the Random Variable: The First Hitting Time, Neural Network World, 3, 243-253 (1998) (Zumbach, 1998), discussed below in section 4.

If the target zone of the option is not a box but, for example, a circle, or a set of many boxes, the situation becomes more complicated. In such a case, hitting the front and hitting the top or bottom are not as easily distinguishable as for a box. The preferred methodology in such a case is the use of binomial (or trinomial) trees (see Section 8, below).

3. Basic Ingredients

One goal of the subject invention is to achieve a pricing formula with reasonable precision. A danger to be avoided is over-engineering of the algorithm. In principle, almost all the problems of mathematical finance have an influence on the pricing, but we cannot solve all open research problems before specifying the pricing algorithm.

Therefore, the most important ingredients and effects have to be identified and efficiently modeled. These are the main ingredients addressed by a preferred embodiment:

Spot price data. We need a raw data input.

Daily and weekly seasonality of volatility. Ignoring this can easily lead to mispricing.

Volatility forecasting. The quality of volatility forecasts almost directly defines the quality of computed option premiums.

Announcements. Financial announcements may cause a volatility shock affecting the option premium.

Heavy tails of the distribution function of returns. The hitting probability of boxes placed far in-the-money or out-of-the-money strongly depends on the behavior of extreme returns.

Micro-oscillations. In high time resolution (e.g., minutes), small, mean-reverting price oscillations occur on top of the normal price process. These oscillations lead to higher hitting probabilities.

Interest on the invested capital and interest rate differentials.

A preferred embodiment of the subject method can compute probability estimates for reaching any infinitesimal spot of the price-time plane. This is an intermediary result on the way to computing the hitting probability of finite boxes. An evaluation of the effects discussed above shows that one can expect to have errors of about 20% of local probability estimates. Thus we ignore subtle effects affecting the probability estimates by less than, say, 5%.

Once we have the volatility forecast, we compute the probability estimates for any infinitesimal spot of the price-time plane, assuming a Brownian motion of the logarithm of price over $\theta$-time (discussed below in Section 3.3), modified by a heavy-tail correction. From this, we compute the probability of entering the box.

3.1 Spot Price Data

A preferred embodiment requires a raw data input. In order to price the box option, we need the starting point: the price "now." A data input is also indirectly needed as a basis of the volatility forecast (see Section 3.3). The price data may come from any source. In the case of options on foreign exchange (FX) rates, the most convenient data source for a system is the time series of middle prices generated by a system's own market making in the FX spot market. In the description herein of preferred embodiments, data is simply assumed to be available.

It should be noted that the methods described herein are applicable to data other than FX data. Any data that can be displayed in a time chart, such as the price of butter, or the temperature in Madrid, can also serve as a basis (an "asset") for the disclosed options. The term "asset" is thus used herein to refer to any quantity whose value is time-dependent.

3.2 Seasonality of Volatility

Ignoring daily and weekly seasonality of volatility can easily lead to volatility errors of a factor of two, and to similar pricing errors. A time scale that takes seasonality effects into account, such as "$\theta$-time" (see Dacarogna et al., A Geographical Model for the Daily and Weekly Seasonal Volatility in the FX Market, Journal of International Money and Finance, 12(4), 413-438 (Dacarogna 1993), is a useful tool for minimizing such errors, and is used in a preferred embodiment.

3.3 Volatility Forecast

A forecast is required for the volatility of the relevant period of the option: from "now" until the end-time of the box. Implied volatility figures and the well-known Risk-Metrics method are too slow and inert and suffer from an unacceptably high forecasting error. A good volatility forecast should also use some fast intra-day information. Even a good volatility forecast may have an error of, say, 15% of the resulting forecast value.

The expected error of the volatility forecast is also a variable of interest. The true volatility in the future is expected to be approximately log-normally distributed about a mean. Therefore, we assess mean and standard deviation of log(volatilityForecast). The standard deviation is in general larger for intra-day than for long-term volatility forecasts. The expected standard deviation is closely related to the heavy tails of the expected distribution function of returns, as discussed below in section 3.5.

A preferred embodiment also considers local heteroskedasticity (fluctuations of the assumed volatility inside the period), when the option period is long. Also, the sudden volatility shock due to financial announcements is taken into account; see section 3.4.

Herein we assume that volatility forecasts are just an external input, so their computation is outside the scope of this description.

3.4 Announcements

There are some scheduled days for financial announcements such as the release of key economic figures. Some economic figures, particularly unexpected ones, lead to price and volatility outbursts that strongly affect the volatility and the pricing of the box option. Announcement shocks are not too frequent, but when they happen, they can lead to pricing errors of a factor of two or more.

To take into account such announcement shocks, a preferred embodiment uses a safety factor in the final pricing formula, either initiated by human intervention or following standard assumptions on likely days and times of announcements.

3.5 Heavy Tails

The distribution function of returns has heavy tails. If the box of the option is located in an extreme region of the price-time plane, the hitting probability is very low. When assuming a Brownian motion of (logarithmic) prices, we underestimate this probability and the necessary premium to cover the risk. We need a model of the heavy tails, to avoid dangerous underpricing.

One way to understand heavy tails is to explain them by an uncertainty of volatility. This means that we assume a Gaussian behavior of returns in the near future but we do not exactly know the volatility. We have a volatility forecast, but the true volatility in the near future is assumed to deviate from this forecast. This assumption can be seen as equivalent to assuming a perfectly known volatility with a heavy-tailed distribution function: a mixture of normal distributions with different variances.

A preferred embodiment models this by computing the box hitting probability for different volatility assumptions (scenarios) in the future—each such assumption with its own probability. The assumed volatility values are centered around the volatility forecast, but we also need an assumption on typical deviations of future volatility from this volatility forecast.

Example for a log(volatility) forecast of log(10%): Explore four different volatilities according to Hermite integration for log(volatility):
1. Volatility=7.2% with weight 0.05
2. Volatility=9.0% with weight 0.45
3. Volatility=11.1% with weight 0.45
4. Volatility=13.9% with weight 0.05

We already have a log-normal model of volatility (see section 3.3). This fits nicely with our modeling of heavy tails. Obtaining realistic tails of the return distribution is important for the realistic pricing of options with boxes located far from the current spot price.

When the box hitting probabilities of all volatility scenarios are known, the additivity of probabilities is applied. The resulting overall box hitting probability is the mean of the different box hitting probabilities, each weighted by the probability of the respective scenario.

Some of the announcement shocks that are not modeled explicitly are implicitly accounted for through the modeling of heavy tails.

3.6 Micro-Oscillations

In high time-resolution (e.g., minutes), small, mean-reverting price oscillations occur on top of a price process, similar to a Brownian motion. These oscillations are known to cause a bias in volatility measurements. They may appear not only in multi-contributor markets but also in a preferred system's own spot price; their size depends on the market and the data source.

The micro-oscillations lead to a higher box-hitting probability, and thus should be accounted for. In a preferred embodiment, a box of increased vertical extension is used, unless the box has a duration too short to be affected by micro-oscillations. A reasonable assumption is:

$$\text{Extension} = 0.04 \frac{\Delta t}{\Delta t + 0.0006} SizeOfOneDayMove \quad (1)$$

where $\Delta t$ is the duration of the box in days of the chosen time scale (e.g., $\Theta$-time). The extension is quantified here as a small multiple of the typical size of a price change in one day. The parameters of the formula can be modified, within limits recognized by those skilled in the art. The extension should be made on both sides of the price range of the box.

3.7 Interest Rate Effects

A box option has a nontrivial lifespan. Therefore, interest on the invested capital and the interest differential between the two underlying currencies have an influence on the pricing of the option. A preferred embodiment takes these effects into account:

Interest on the invested capital. The option buyer has to pay the option premium to a preferred system's margin account. There, it earns some interest according to the technical nature of that margin account, until the option expires.

Interest rate differential. An option with a box higher than the current price behaves a bit like an ordinary call option. Therefore, it has a positive "delta" (derivative of premium against spot price). A box lower than the current price leads to a negative delta. Options with nonzero delta locally behave like investments in the underlying instrument, so the interest differential is significant. Smart customers could exploit this small effect to the disadvantage of an operator of a preferred system. Thus:

A preferred embodiment uses only major rates with low interest differentials and limits the lifetime of the option to a few weeks. Thus, the effect of interest differentials on pricing becomes negligible.

An alternate embodiment fully integrates the interest differential into the pricing method (not only superficially, but also assuming a Brownian motion around the forward rate instead of the current spot rate).

4 Direct Solution

A preferred embodiment prices a box option directly (i.e., without a binomial tree) using a result from (Zumbach 1998).

4.1 Equations of the Hitting Probabilities

Figure 4:
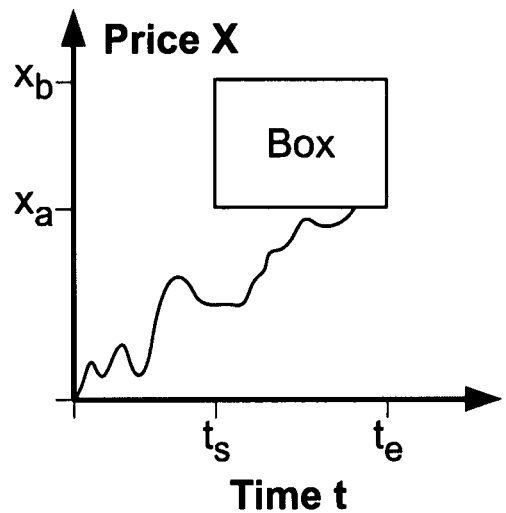
FIG. 4 illustrates box option parameters and depicts a box option being hit from below.

We assume a box option with start-time $t_s$, end-time $t_e=t_s+\Delta t$, lower price limit $x_a$, upper price limit $x_b$ (see FIG. 4). With no loss of generality, the solution is derived with the time definition $t=0$ at time "now" (the time of the pricing); similarly, we assume $x(0)=0$ for the logarithmic mid-price.

The symbol t stands for the chosen time scale, whatever it is. A preferred embodiment uses a $\Theta$-time scale (see section 3.2). However, other time scales are also acceptable, as those skilled in the art will recognize (see section 7.3 below).

At this point, we assume only one volatility level $\sigma$, and Brownian motion within one scenario (see section 3.5).

At time $t_s$, three different things are possible:

1. $x(t_s) > x_b$. We are above the box; the only possibility of hitting the box is to hit it first through the upper limit at $x_b$.
2. $x_a \le x(t_s) \le x_b$. We are hitting the box through its front, already at $t_s$.
3. $x(t_s) \le x_a$. We are below the box; the only possibility of hitting the box is to hit it first through the lower limit at $x_a$.

There is no other case but these three cases, and no possible price curve belongs to two cases at the same time. Therefore, the total probability of hitting the box is the sum of the three hitting probabilities of the three cases.

Although the price curve $x(t)$ is treated herein as if continuous, we only have discrete points in practice. Therefore, crossing of the whole box from above to below (or from below to above) is also regarded as "hitting." This may happen for thin boxes where $x_b$ is very close to $x_a$.

To determine the probability of the second case of the list, hitting through the front, we need to know the probability of arriving at a price $x(t_s)$ between $x_a$ and $x_b$ for a Brownian motion. This is $$p_{front} = 0.5 \left[ \Phi\left(\frac{x_b}{\sigma\sqrt{t_s}}\right) - \Phi\left(\frac{x_a}{\sigma\sqrt{t_s}}\right) \right] \tag{2}$$

where $\Phi$ is the error function:

$$\Phi(u) = \frac{2}{\sqrt{2\pi}} \int_0^u e^{-\frac{v^2}{2}} dv \tag{3}$$

The first and third cases of the list are more complicated. The first case, hitting through the upper limit, is treated as follows. The probability of hitting the infinitesimal interval between $x(t_s) = x_s$ and $x(t_s) = x_s + dx$ is $[1/(\sqrt{2\pi t_s}\sigma)] \exp[-(x^2)/(2\pi^2 t_s)]dx$. If we are in this case, the total probability of hitting the box through the upper limit can be computed with the help of Equation (4) of (Zumbach 1998). It is $$p_{upperLimit, x(t_s) = x_s} = 1 - \Phi\left(\frac{x_s - x_b}{\sigma\sqrt{\Delta t}}\right) \tag{4}$$

This can be integrated over all possible start prices $x_s > x_b$. The resulting probability of hitting the box through the upper limit (starting from any $x(t_s) > x_b$) is $$p_{upperLimit} = \frac{1}{\sqrt{2\pi}\,\sigma\sqrt{t_s}} \int_{x_b}^{\infty} e^{-\frac{x^2}{2\sigma^2 t_s}} \left[1 - \Phi\left(\frac{x - x_b}{\sigma\sqrt{\Delta t}}\right)\right] dx \tag{5}$$

The third case of the list, hitting through the lower limit, is solved analogously to obtain $$p_{lowerLimit} = \frac{1}{\sqrt{2\pi}\,\sigma\sqrt{t_s}} \int_{-\infty}^{x_a} e^{-\frac{x^2}{2\sigma^2 t_s}} \left[1 - \Phi\left(\frac{x_a - x}{\sigma\sqrt{\Delta t}}\right)\right] dx \tag{6}$$

Eqs. 5 and 6 cannot be analytically integrated in the general case. Numerical integration is required; a recipe is given in the next section.

4.2 Numerical Integration of the Hitting Probability

The integral of eq. 5 extends to infinity. Its integrand rapidly goes to zero for extreme values of x, but it is not immediately clear where the integrand has its highest mass. Under these circumstances, numerical integration is not trivial. We need a method to carefully select a limited set of x values at which the integrand is evaluated.

To get an idea of the overall form of the integrand, we re-write the factor $[1-\Phi(.)]$ of eq. 5:

$$1 - \Phi(u) = f(u) e^{-\frac{(u+1)^2}{2}} \tag{7}$$

The last factor essentially defines the order of magnitude of $[1-\Phi(u)]$. The first factor, the function $f(u)$, is a slowly-varying, smooth function that does not change its order of magnitude for any positive value of $u$.

Inserting eq. 7 into eq. 5 yields $$p_{upperLimit} = \frac{1}{\sqrt{2\pi}\,\sigma\sqrt{t_s}} \int_{x_b}^{\infty} e^{-\frac{x^2}{2\sigma^2 t_s}} f\left[\left(\frac{x - x_b}{\sigma\sqrt{\Delta t}}\right)\right] e^{-\frac{(x - x_b + \sigma\sqrt{\Delta t})^2}{2\sigma^2 \Delta t}} dx \tag{8}$$

Now we see two factors of the Gaussian type in the integrand. The product of two Gaussian factors of the type $\exp[-(x-a)^2/2b^2]$ can be shown to be a constant times a new Gaussian factor of the same type. This means that our integrand behaves similarly to a Gaussian bell curve. In fact, the sole purpose of our analysis is to demonstrate this fact and to approximately determine the mean and the variance of the new Gaussian bell curve. Then we know where the integrand has its mass.

From eq. 8, we obtain $$p_{upperLimit} = \frac{1}{\sqrt{2\pi}\,\sigma\sqrt{t_s}} \int_{x_b}^{\infty} F\left[\left(\frac{x - x_b}{\sigma\sqrt{\Delta t}}\right)\right] e^{-\frac{(x - \mu')^2}{2\sigma'^2}} dx \tag{9}$$

The function $F(u)$ is $f(u)$ times a constant factor and thus has the same slowly varying properties as $f(u)$. We do not need to compute this. The main results are the mean and variance of the Gaussian factor of the integrand. The mean is $$\mu' = \frac{t_s (x_b - \sigma\sqrt{\Delta t})}{t_s + \Delta t} \tag{10}$$

The variance is $$\sigma'^2 = \sigma^2 \frac{t_s \Delta t}{t_s + \Delta t} \tag{11}$$

This means that the variance is smaller than the variance of either Gaussian factor of eq. 8. The mean $\mu'$ lies between the means of the two Gaussian factors, closer to the mean of the narrower Gaussian factor.

Now we are ready to introduce an integration scheme. This should be centered around $\mu'$ and be optimal for a normal distribution with variance $\sigma'^2$. At first sight, we might be tempted to use Hermite integration, as in the case of the volatilities of section 3.5. However, that integration scheme is suited to integrals from $-\infty$ to $\infty$ or from the center of a Gaussian-like distribution to ∞. This is not the case here: one of the two integration limits can be anywhere.

Therefore, we have to choose an integration scheme with flexible limits. This can be done as follows. First, we make a monotonic coordinate transformation:

$$\xi = \xi(x) = \frac{x - \mu'}{\sqrt{4\sigma'^2 + (x - \mu')^2}} \quad (12)$$

where $\xi$ is confined between −1 and 1. The inverse transformation is $$x = x(\xi) = \mu' + \frac{2\sigma'\xi}{\sqrt{1 - \xi^2}} \quad (13)$$

Note that x is centered around $\mu'$, with $\xi(\mu')=0$, as desired for a reasonable integration scheme. The derivative is $$\frac{dx}{d\xi} = 2\sigma'(1 - \xi^2)^{-1.5} \quad (14)$$

A transformation based on the Gaussian integral or exponential functions would also be appropriate but would not be analytically invertible and/or would lead to more complicated expressions.

The idea is to integrate over $\xi$ rather than x. The upper integration limit (x=∞) becomes finite: $\xi$=1. Thus the integration is over a finite interval, for which Gaussian integration is optimal. The formula for any integrable function g(x) (see Table 25.4, Abscissas and Weight Factors for Gaussian Integration, of Abramowitz, M. and Stegun, A., Handbook of Mathematical Functions, (9th ed. 1970) (A&S 1970)) is:

$$\int_a^b g(x)dx = 2\sigma' \int_{\xi(a)}^{\xi(b)} g[x(\xi)](1 - \xi^2)^{-1.5} d\xi \quad (15)$$

where eq. 14 has been used. The new factor $(1-\xi^2)^{-1.5}$ becomes very large when $\xi$ approaches 1 or −1. The integral behaves well because the factor $g[x(\xi)]$ goes to zero even more quickly (exponentially, as already shown in eq. 9).

The next task is to insert the integrand of eq. 5 as the function g(x) and to numerically integrate over the finite $\xi$ interval from $\xi(x_b)$ to 1, using Gaussian integration: Details are explained in section 7.

After computing $p_{upperLimit}$, the probability $p_{lowerLimit}$ is calculated by an analogous integration method.

4.3 The Total Box Hitting Probability
The total box hitting probability is now the sum:

$$p = p_{front} + p_{upperLimit} + p_{lowerLimit} \quad (16)$$

This is the hitting probability of one volatility assumption. The final hitting probability is the weighted mean of all volatility assumptions, following the scheme discussed in section 3.5.

Since we have hitting probability values for different volatility scenarios, we can also compute the sensitivity of the hitting probability (and thus the option premium) against changes in the volatility. In the option pricing literature, this is sometimes called the "vega" of an option.

5 Final Pricing
The theoretical price (premium) of a box option is the product of the hitting probability p and the amount A of money paid when hitting the box.

In a preferred embodiment, a box option is sold at a slightly higher price than the theoretical price, in order to cover some risk and operating costs and to ensure that at least a minimum of profitability is attained.

In one preferred embodiment, we replace p by a modified probability p' with a safety margin, but still between 0 and 1:

$$p' = \frac{(1 + c)p}{1 + cp}$$

where c is a non-negative safety parameter. A value c=0 leaves the probability unchanged, whereas a value c=1 implies a robust margin: a probability p=½ is modified to p'=⅔.

In a second preferred embodiment, a small fee F per deal is charged. This fee should cover an operator of a preferred system's in-house costs per individual deal (which are small but larger than zero) and prevent customers from buying too-small option contracts.

The option premium P is then $$P = \frac{(1 + c)p}{1 + cp} A + F \quad (17)$$

An initial value of c may be 1. However, option trading operators of a preferred system should have an on-line access to this variable. By carefully choosing and resetting c, system operators can control the optimal balance of risk, return, and trading volume.

6 Hedging the Risk
Option traders often do not want to be exposed to the full risk of an option portfolio. Delta hedging is a usual way to reduce the risk: taking a position in the underlying instrument that neutralizes the risk due to sudden changes of the spot price.

The direct method (as well as the binomial or trinomial tree method) provides a numerical method to compute the delta (the first derivative of the option premium against the underlying spot price). Even if delta can be continuously computed, efficient delta hedging is an art when considering also the transaction costs and the re-ledging frequency which also depends on gamma, the second derivative.

The first question is whether delta hedging makes any sense for the box option of a preferred embodiment. The answer is yes, if the box asymmetrically extends to a region outside the neighborhood of the current spot price. Then the dynamic behavior of the box option is similar to that of a conventional option.

However, if the box is located around the level of the current spot price, delta hedging is not particularly relevant to the true risk. The value of such a box option is rather insensitive against the spot price, leading to delta values around zero. The main risk of such options arises from the behavior of volatility and its forecast. A similar problem exists in the opposite case, when all boxes are far away from the current spot price (but both below and above). The risk is similar to that of a straddle, strangle, or barrier option. A high quality volatility forecast reduces but does not totally eliminate this risk.

Thus, part of the risk of box options can be hedged through delta hedging, whereas another part cannot (or only through much more sophisticated methods).

There are two other ways to limit the risk: diversification and pricing margin. Diversification is the natural result of a large, heterogeneous group of customers, but hard to reach initially. The pricing margin has been discussed in section 5; choosing a sufficiently high c value will help to keep the risk at bay even in difficult situations.

7 The Algorithm

In this section, the recipe for pricing the option is given, step by step. The described method is designed for speed of computation.

The described method can be used in two ways:
1. as a piece of production software used to price box options in real time;
2. in a test program to explore the behavior of the box option with historical data.

The main piece of software presented in this section is preferably used in both applications.

The description of the software algorithm connects the theory described in the preceding sections with the software implementation of a preferred embodiment. It can be used both as a recipe for the software developer and as an implementation description for the theoretician.

7.1 Step 1: Configuration

There are a few constant configuration parameters of the algorithm that do not depend on the input parameters of a particular box option:

The minimum time $\Delta t_s$ from "now" to the start of the box option. The decision process of customers selecting a box option and confirming their option purchase may take a few seconds that allow them to watch the market, perhaps using quicker market price information than a preferred system's official spot price. In order to prevent bad deals due to information advantages on the order of seconds, a minimum interval from "now" to the box option start-time of, say, $\Delta t_s=10$ minutes is specified.

The maximum time $\Delta t_e$ from "now" to the end time of the box option. We need this to limit the problem of interest rate differentials (see section 3.7).

The assumed standard forecast error $\sigma_o$ of the logarithm of the volatility forecast. In a preferred embodiment, this is a constant configuration parameter: $\sigma_o=0.2$ or thereabouts.

The parameters of numerical integration (Hermite, Gaussian). These are mentioned below, in the steps where they are actually used.

The safety margin parameter c of the pricing (see eq. 17). The initially chosen value is c=1 or slightly less.

The maximum size $A_{max}$ of the option contract: the amount paid to the successful buyer of one box option is limited to $A_{max}$. The size depends on the trading policy of an operator of a preferred system. Initially, $A_{max}$ may be something like 10,000 USD (U.S. dollars); in a mature system, it can be higher.

The fee F per option contract. This is designed to cover the marginal costs of managing one additional contract and to prevent customers from buying options of too-small contract size. F may be small: something like 2 USD.

Note that the configuration parameter values are not engraved in marble. An operator of the preferred option trading system has the ability to change some values on-line (or at least through a quick re-start with no down-time visible to customers). The parameters that may be modified are $\Delta t_s$, $\Delta t_e$, c, F, $A_{max}$, and $\sigma_o$.

7.2 Step 2: Input Data

The following input data is given at start of the box option pricing:

The time "now": $t_{now}$. This is the time point at which the pricing is computed. In real-time operation, this simply means reading the clock.

The price "now": $p_{now}$. This is the last valid, official spot price before or at $t_{now}$. We take the geometric mean of bid and ask price: $p_{now}=\sqrt{p_{bid}p_{ask}}=\exp[0.5(\ln p_{bid}+\ln p_{ask})]$.

The time stamps of the box: $t_s$ at start and $t_e$ at the end of the box. These must obey the condition $t_{now}+\Delta t_s \leq t_s \leq t_e \leq t_{now}+\Delta t_e$.

The lower and upper price limits of the box: $p_a$ and $p_b$. These must obey the condition $0 \leq p_a \leq p_b$.

A positive volatility forecast $\sigma_0$. In a preferred embodiment, there is only one such forecast: typically a forecast for one working day, starting at $t_{now}$. We need $\sigma_0$ normalized to 1 day (not annualized or normalized to 1 working day), because it is used together with $\Theta$-time, which is in units of days. (If the raw value is annualized, divide it by $\sqrt{365.25}$).

The size A of the payout that the user will receive if the price curve hits the box. To limit the risk to operators of the preferred system, a maximum value has to be observed: $A \leq A_{max}$.

The software is preferably modular, so that a user of the box option pricing method does not have to care about the source of this input data. The existence of the input data is taken for granted herein.

7.3 Step 3: Convenient Variables Computed from the Input Data

We construct some convenient intermediary variables:

Introduction of $\Theta$-time. We compute the $\Theta$-time increments between the time stamps:

$$\Theta_s=\Theta\text{Interval}(t_s,t_{now}), \Delta\Theta=\Theta\text{Interval}(t_e,t_s).$$

For numerical reasons, we need $\Delta\Theta>0$. If $\Delta\Theta<0.0001\Theta_s$, we correct it to $\Delta\Theta=0.0001\Theta_s$. (We assume $\Theta=0$ at $t_{now}$; the box starts at $\Theta=\Theta_s$ and ends at $\Theta=\Theta_s+\Delta\Theta$; $\Theta$ is always handled in units of days).

Interval computes the time difference between two time points, where the difference is in days on the $\Theta$-time scale. However, although the precision is higher (resulting in a competitive advantage in option pricing) when $\Theta$-time is used, other choices of business time could be used. Examples are normal clock time omitting the two week-end days (and then multiplying the resulting time interval by 1.4, or even normal, unmodified clock time.

Logarithmic prices. We define $x=\ln(p/p_{now})$ and take micro-oscillations into account according to section 3.6

$$\Delta x_{micro} = 0.04 \frac{\Delta \vartheta}{\Delta \vartheta + 0.0006} \sigma_0,$$

following eq. 1. (The constants of this formula could be formally treated as configuration parameters, but this is of little importance given the small size of $\Delta x_{micro}$). The logarithmic prices are computed as follows:

$$x_a=\ln(p_a/p_{now})-\Delta x_{micro}, x_b=\ln(p_b/p_{now})+\Delta x_{micro}.$$

(This implies that the x value at $\Theta=0$ is $x(0)=0$).

Mean logarithmic volatility. The volatility $\sigma_0$ is the assumed mean volatility. The mean logarithmic volatility is computed as follows:

$\mu_\sigma = \ln \sigma_0 - 0.5 \sigma_\sigma^2$.

We also use the variable $\sigma_\sigma' = \sqrt{2}\sigma_\sigma$.

7.4 Step 4: Loop Over Different Volatility Scenarios

Now, we have to distinguish between different volatility scenarios and execute the following steps for each volatility scenario separately. The volatility $\sigma_o$ of the ith scenario is computed with the following formula:

$\sigma_i = \exp(\mu_\sigma + c_i \sigma_\sigma')$.

The factor $c_i$ is a coefficient of Hermite integration (see Table 25.10 of (A & S 1970)). A preferred embodiment preferably uses n=5 is proposed. This means that we use 5 different volatility scenarios. In this case, the coefficients and the weights of Hermite integration are as follows:

$c_1 = -2.02018\ 28704\ 56086$, $w_1 = 0.01\ 99532\ 42059\ 05$;
$c_2 = -0.95857\ 24646\ 13819$, $w_2 = 0.3\ 93619\ 32315\ 22$;
$c_3 = 0.00000\ 00000\ 00000$, $w_3 = 0.9\ 45308\ 72048\ 29$;
$c_4 = 0.95857\ 24646\ 13819$, $w_4 = 0.3\ 93619\ 32315\ 22$;
$c_5 = 2.02018\ 28704\ 56086$, $w_5 = 0.01\ 99532\ 42059\ 05$.

These values can be found in (A&S 1970), Table 25.10, Abscissas and Weight Factors for Hermite Integration. The weights $w_i$ are needed at the end, when the final result is computed from all the different volatility scenarios. We store these constant weights in normalized form: we store normalized weights $w_i'$ instead of the initial weights $w_i$. The formula to compute all $w_i'$ is: $w_i' = w_i/\sqrt{\pi}$. The normalized weights $w_1'$ add up to 1.

The next main step (described in section 7.5) is done for each volatility scenario separately.

7.5 Step 5: Compute the Box Hitting Probability

Here we are inside a volatility scenario with volatility $\sigma_i$. The computation of the box hitting probability, a central portion of the described method, is divided into the following sub-steps.

7.5.1 Step 5a: Probability of Hitting through the Front

First we compute the probability of hitting the box through the front, using eq. 2:

$$p_{front} = 0.5 \left[ \Phi\left(\frac{x_b}{\sigma_i \sqrt{\vartheta_s}}\right) - \Phi\left(\frac{x_a}{\sigma_i \sqrt{\vartheta_s}}\right) \right]$$

The function $\Phi(u)$ can be computed as erf($\sqrt{2}u$), where erf is a function of the math.c library. As is known in the art, constants such as $\sqrt{2}$ and repeatedly-used intermediary results such as the product $\sigma_i\sqrt{\Theta_s}$ should be stored and re-used instead of computed from scratch at each new application.

7.5.2 Step 5b: Probability of Hitting through the Upper Limit

Computing $p_{upperLimit}$ and $p_{lowerLimit}$ requires a much larger effort. We start with $p_{upperLimit}$.

The integrand of eq. 5 has its highest value around a mean $\mu'$ that results from eq. 10:

$$\mu' = \frac{\vartheta_s(x_b - \sigma_i\sqrt{\Delta\vartheta})}{\vartheta_s + \Delta\vartheta}$$

The variance of the integrand about this mean is approximately given by eq. 11:

$$\sigma'^2 = \sigma_i^2 \frac{\vartheta_s + \Delta\vartheta}{\vartheta_s + \Delta\vartheta}$$

For $\sigma_i$, we insert the volatility of the selected volatility scenario.

Now, we make a numerical integration in a loop over different $\xi$ values as follows. The integration limits are $\xi_b$ and 1; we compute $$\xi_b = \frac{x_b - \mu'}{\sqrt{4\sigma'^2 + (x_b - \mu')^2}}$$

following eq. 12. We also need the middle of the $\xi$ range, $\xi_0 = 0.5(\xi_b + 1)$ and the size of the half range, $\Delta\xi = 0.5(1 - \xi_b)$.

The $\xi$ values of the Gaussian integration are given by: $\xi_j = \xi_0 + k_j \Delta\xi$. The factor $k_j$ is a coefficient of the Gaussian integration (see Table 25.4 of (A & S 1970)). In a preferred embodiment, we assume m=6 different function evaluations for the integration. This is a low number for numerical integration, leading to short computation time; the low number can be justified by the careful choice of the integration scheme. A higher number m leads to more precise results, of course. The coefficients and the weights of Gaussian integration are as follows:

$c_1 = -0.93246\ 95142\ 03152$, $w_1 = 0.17132\ 44923\ 79170$;
$c_2 = -0.66120\ 93864\ 66265$, $w_2 = 0.36076\ 15730\ 48139$;
$c_3 = -0.23861\ 91860\ 83197$, $w_3 = 0.47862\ 86704\ 99366$;
$c_4 = 0.23861\ 91860\ 83197$, $w_4 = 0.47862\ 86704\ 99366$;
$c_5 = 0.66120\ 93864\ 66265$, $w_5 = 0.36076\ 15730\ 48139$;
$c_6 = 0.93246\ 95142\ 03152$, $w_6 = 0.17132\ 44923\ 79170$.

These values can be found in (A& S 1970), Table 25.4. The constant weights $w_i$ are preferably stored in normalized form; that is, normalized weights $w_i'$ are stored instead of the initial weights $w_i$. The formula to compute all $w_i'$ is $w_i' = 0.5 w_i$. The normalized weights $w_i'$ add up to 1.

The integration is a loop over all j from 1 to m. For each j, we compute $\xi_j$ and then the corresponding logarithmic price $x_j$:

$$x_j = \mu' + \frac{2\sigma'\xi_j}{\sqrt{1 - \xi_j^2}}$$

following eq. 13. Then the integrand is computed:

$$I_j = e^{-\frac{x_j^2}{2\sigma_i^2 \vartheta_s}} \left[ 1 - \Phi\left(\frac{x_j - x_b}{\sigma_i \sqrt{\Delta\vartheta}}\right) \right] (1 - \xi_j^2)^{-1.5}$$

following eqs. 5 and 15. The function $\Phi(.)$ is computed as explained in section 7.5.1. The integral is a weighted sum using the normalized weights $w_j'$ of Gaussian integration:

$$I = \sum_{j=1}^{m} w_j' I_j$$

This integral I has to be multiplied with the factors of eqs. 5 and 15:

$$P_{upperLimit} = \frac{2\sigma'}{\sqrt{2\pi}} \frac{I}{\sigma_i \sqrt{\vartheta_s}}$$

This is the desired probability $p_{upperLimit}$.

7.5.3 Step 5c: Probability of Hitting through the Lower Limit

Computing $p_{lowerLimit}$ is analogous to computing $p_{upperLimit}$, so the code to compute both variables can be shared to a high degree. In the following description, a full account of the computation of $p_{lowerLimit}$ is given. A software developer skilled in the art will find opportunities to use equivalent methods for computing $p_{lowerLimit}$ and $p_{upperLimit}$.

The integrand of eq. 6 has its highest value around a mean $\mu'$ (see eq. 10):

$$\mu' = \frac{\vartheta_s(x_a + \sigma_i \sqrt{\Delta\vartheta})}{\vartheta_s + \Delta\vartheta}$$

The model variance of the integrand about this mean is:

$$\sigma'^2 = \sigma_i^2 \frac{\vartheta_s \Delta\vartheta}{\vartheta_s + \Delta\vartheta}$$

(see eq. 11), just as for $p_{upperLimit}$. For $\sigma_i$, we again insert the volatility of the selected volatility scenario.

We again make a numerical integration in a loop over different $\xi$ values. The integration limits are now $-1$ and $\xi_a$; we compute $$\xi_a = \frac{x_a - \mu'}{\sqrt{4\sigma'^2 + (x_a - \mu')^2}}$$

again following eq. 12. The middle of the $\xi$ range is $\xi_0 = 0.5 (\xi_a - 1)$, and the size of the half range is $\Delta\xi = 0.5(1+\xi_a)$.

The $\xi$ values of the Gaussian integration are given by: $\xi_j = \xi_0 + k_j \Delta\xi$. The factors $k_j$ are again coefficients of the Gaussian integration; we take the same coefficients $k_j$ and normalized weights $w_j'$ as in section 7.5.2.

The integration is a loop over all j from 1 to m. For each j, we again compute $\xi_j$ and then the corresponding logarithmic price $x_j$:

$$x_j = \mu' + \frac{2\sigma'\xi_j}{\sqrt{1-\xi_j^2}}$$

(following eq. 13). Then the integrand is computed:

$$I_j = e^{-\frac{x_j^2}{2\sigma_i^2 \vartheta_s}} \left[1 - \Phi\left(\frac{x_a - x_j}{\sigma_i \sqrt{\Delta\vartheta}}\right)\right](1-\xi_j^2)^{-1.5}$$

(see eqs. 5 and 15). The function $\Phi(.)$ is again computed as explained in section 7.5.1. The integral is a weighted sum using the weights $w_j'$ of Gaussian integration:

$$I = \sum_{j=1}^{m} w_j' I_j$$

This integral I has to be multiplied by certain factors, as in section 7.5.2:

$$P_{lowerLimit} = \frac{2\sigma'}{\sqrt{2\pi}} \frac{I}{\sigma_i \sqrt{\vartheta_s}}$$

This is the desired probability $p_{lowerLimit}$.

7.5.4 Step 5d: Probability of Hitting the Box Anywhere

The total box hitting probability is given by eq. 16:

$$p_i = p_{front} + p_{upperLimit} + p_{lowerLimit}$$

We write $p_i$ because this result still belongs to the ith volatility scenario. In some very extreme cases, a $p_i$ value of slightly more than 1 may result—an impossible value for a probability. In that case, it must be corrected down to $p_i = 1$.

7.6 Step 6: Joint Box Hitting Probability of all Scenarios

The different volatility scenarios are now brought together, thus terminating the loop started in section 7.4.

The resulting box hitting probability is a weighted sum $$p = \sum_{i=1}^{m} w_i' p_i$$

The normalized weights $w_i'$ of Hermite integration as defined in section 7.4 have to be taken. This is the final box hitting probability.

In an alternate embodiment, we also compute a side result: the sensitivity of p (and thus the option premium) against changes (also: bad forecasts) of volatility. When using the scheme of section 7.4 with 5 volatility scenarios, the following approximative formula applies:

$$\partial p/\partial \sigma = (p_4 - p_2)/(\sigma_4 - \sigma_2)$$

(for $\sigma_i$, see section 7.4). This is closely related to the "vega" of the box option.

In a further embodiment, the computation of delta for delta hedging is also performed. This requires another full computation of a hitting probability, so it essentially doubles the computation time. (For also computing the gamma of the box option, we even need a third computation).

7.7 Step 7: Computing the Final Price

The option premium P is computed from the hitting probability p according to eq. 17:

$$P = \frac{(1+c)p}{1+cp} A + F$$

This may be rounded up to the next higher integer USD amount (which means an additional fee of few cents). In some extreme cases, the price P may slightly exceed A by few USD. Such a contract would make no commercial sense, since the premium exceeds the payout.

The price P is the final result of our box option pricing. A system operator preferably offers the box option contract based on a potential payout A at a premium P.

8 Solutions Based on Binomial or Trinomial Trees

In section 4, we saw that we do not need binomial or trinomial trees to price the box option. However, such a tree-based solution is suitable for differently shaped target areas (e.g., circles or triangles), for which an analytical or easily integrable solution does not exist.

Figure 2:
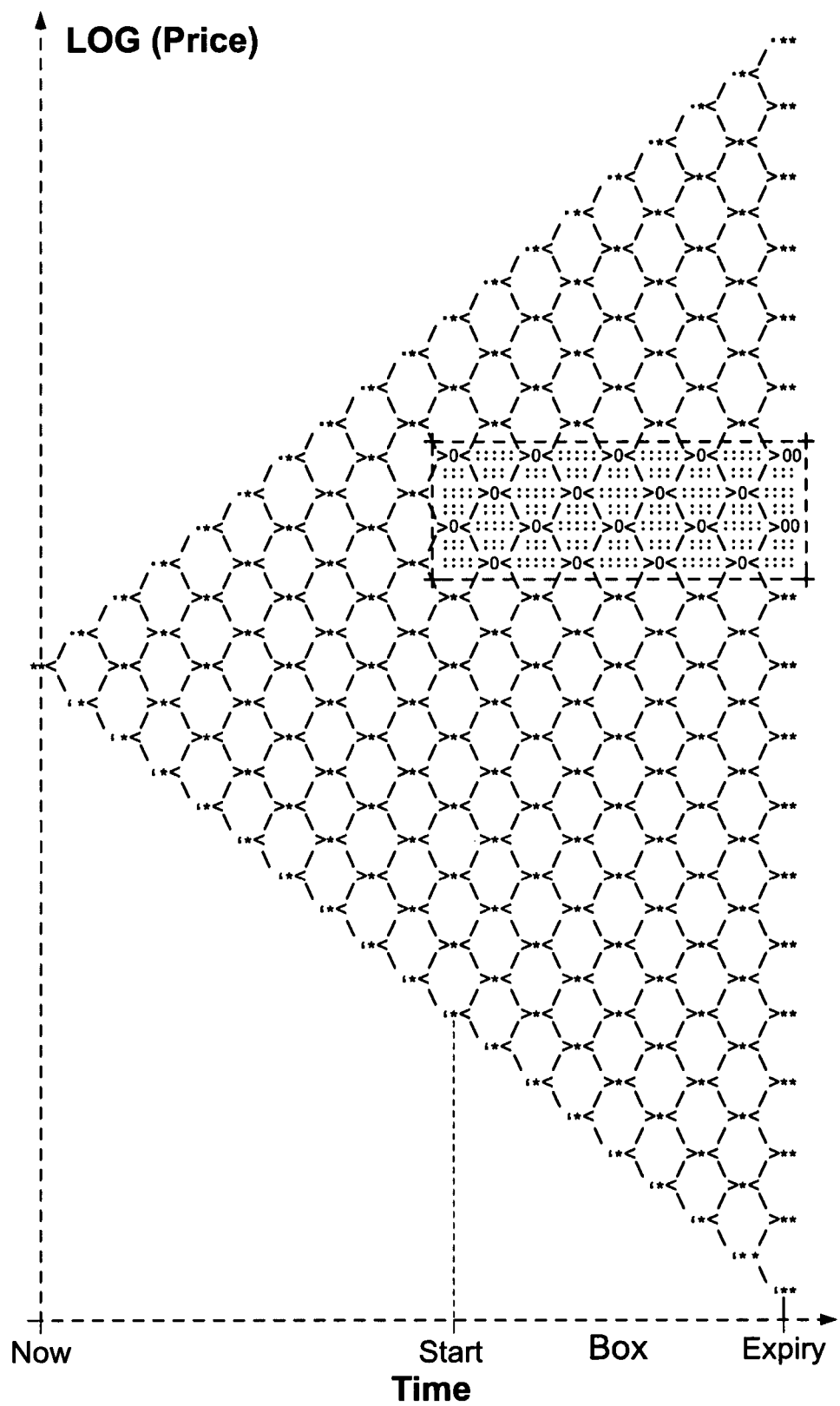
FIG. 2 depicts a box option and a binomial tree.

Binomial trees imply a discretization error: the target zone, (e.g., the box), is approximated by a finite set of nodes of the tree (see FIG. 2). This error can be large for boxes comparable to or smaller than the elementary cells of the binomial tree. In that case, standard correction methods are typically necessary to limit the size of the error.

The binomial tree (see FIG. 3) is known in the art, and has been introduced to derive option prices through arbitrage arguments. On the other hand, it also provides an approximation of probabilities associated to price paths and price target ranges. This is the relevant fact for pricing the box option, since the premium is essentially the box-hitting probability times the pay-off sum.

A binomial tree approximates a Gaussian random walk or Brownian motion (log-normal if this process applies to logarithms of spot prices). It is known that the Brownian motion leads to a normal distribution that grossly underestimates the true probability of extreme price changes (and thus the true probability of hitting a box located at extreme prices). This is a particularly important problem for short-term, intra-day time intervals.

This problem of heavy tails has already been discussed in section 3.5. We solve it as proposed there: assuming different binomial trees based on different volatility assumptions and averaging the resulting hitting probabilities. The method is then very similar to the main method described above, except that individual hitting probabilities are computed through ordinary binomial trees.

9 Functional Description

9.1 User's Perspective

A preferred user application runs as a Java applet (e.g., based on Java AWT 1.1) from a conventional Web Browser (such as Netscape or Windows Explorer), running on a personal computer, such as a Pentium™-based system, communicating with a Webserver via HTTP. To start the application, the user connects to the appropriate URL through a Web Browser. A registered user is prompted to enter a username and password through a form dialog. New (test) users do not need to enter any authorization information, but application functionality is restricted.

After successful connection, a display as depicted in FIG. 1 appears. The display preferably features multiple charts, which are selected and viewed individually by clicking with a mouse (the term "mouse" is used herein to refer generically to any device that controls the movement of a cursor or pointer on a computer display screen; the terms "screen," "computer screen," and computer display screen" are all used herein to refer to any display device that is capable of graphically displaying data received from a computer) on "filing tabs" (EUR-USD, USD-CHF, EUR-CHF, etc.). A menu option allows the set of charts to be re-configured by the user, who can choose from a larger superset. Above the charts is a "Blotter" 135 for transactions and a "Bookkeeper" 140 for accounting information, also interchangeably selectable via filing tabs.

The charts display a time progression of sampled data, in the form of high/low limits and a mean average for each sampling period. A "Zoom" slider 110 allows the time axis scaling and corresponding sample interval size to be adjusted by the user, so that different time ranges—from approximately 1 day to a few months—can be viewed at will.

Data for each chart is fetched from the Webserver on first display. Thereafter, the charts are kept updated by a background thread running in the applet, continuously fetching updates from the Webserver on a periodic basis. Updates are displayed immediately to give a "pseudo-real-time" impression. The applet caches sampled data for the full extent of the zoom ranges so that zooming is fast and responsive—i.e., zooming does not require different data to be fetched from the Webserver.

A "Viewpoint" slider 115 allows a user to move the position of the latest chart point to either the right or left side of the chart. By moving it to the left, more history data becomes visible. By moving it to the right, more"playing area" becomes available for placing windows, as described below.

The chart responds to interaction with a mouse. If the mouse is positioned in the "history" region (the area up to the last chart point), the sampled data values at that position are displayed above the chart in text form. If the mouse is clicked beyond (to the right of) the last chart point, the position is used as an anchor point for a new option box. By keeping the mouse pressed and dragging in any direction, the box dimensions can be "drawn" by the user. The new (dragged) mouse position is taken to mark the corner of the box that is diagonally opposite to the anchor point.

A box defines start-time $t_s$ and end-time $t_e = t_s + \Delta t$, and lower price limit $x_a$, and upper price limit $x_b$. To assist the user, these limits are displayed as text as they size the box. For the time limits (start-time and end-time), the user is constrained by the available area between the latest chart point plus a threshold distance from that point and the right-hand graphical bound of the chart (this is the "playing area"). For the price limits, the user may drag the mouse above or below the graphical bounds of the chart, causing the y-axis (price axis) to be instantly re-scaled to provide a wider range of values.

Once a box has been created in the playing area, context-sensitive buttons below the chart become active. A"Price" button 120 causes the applet to request a price quote for the box from the Webserver. A "Cancel" button 125 causes the new box to be erased.

When the Price button is pressed, a popup dialog window appears in which a booking is formulated. The applet fetches a price quote from the Webserver, which is delivered in the form of a win ratio. The user is invited to select a stake and terms of transaction and is advised what the corresponding payout will be if the box wins. The interpretation of a win (when a payout is made) is as follows:

| Buy or Sell | Hit or Miss | Payout | If . . . |
|---|---|---|---|
| Buy | Hit | To User | The chart plot enters the bounds of the box |
| Sell | Hit | By User | The chart plot enters the bounds of the box |
| Buy | Miss | To User | The chart plot does not enter the bounds of the box |
| Sell | Miss | By User | The chart plot does not enter the bounds of the box |

Figure 19:
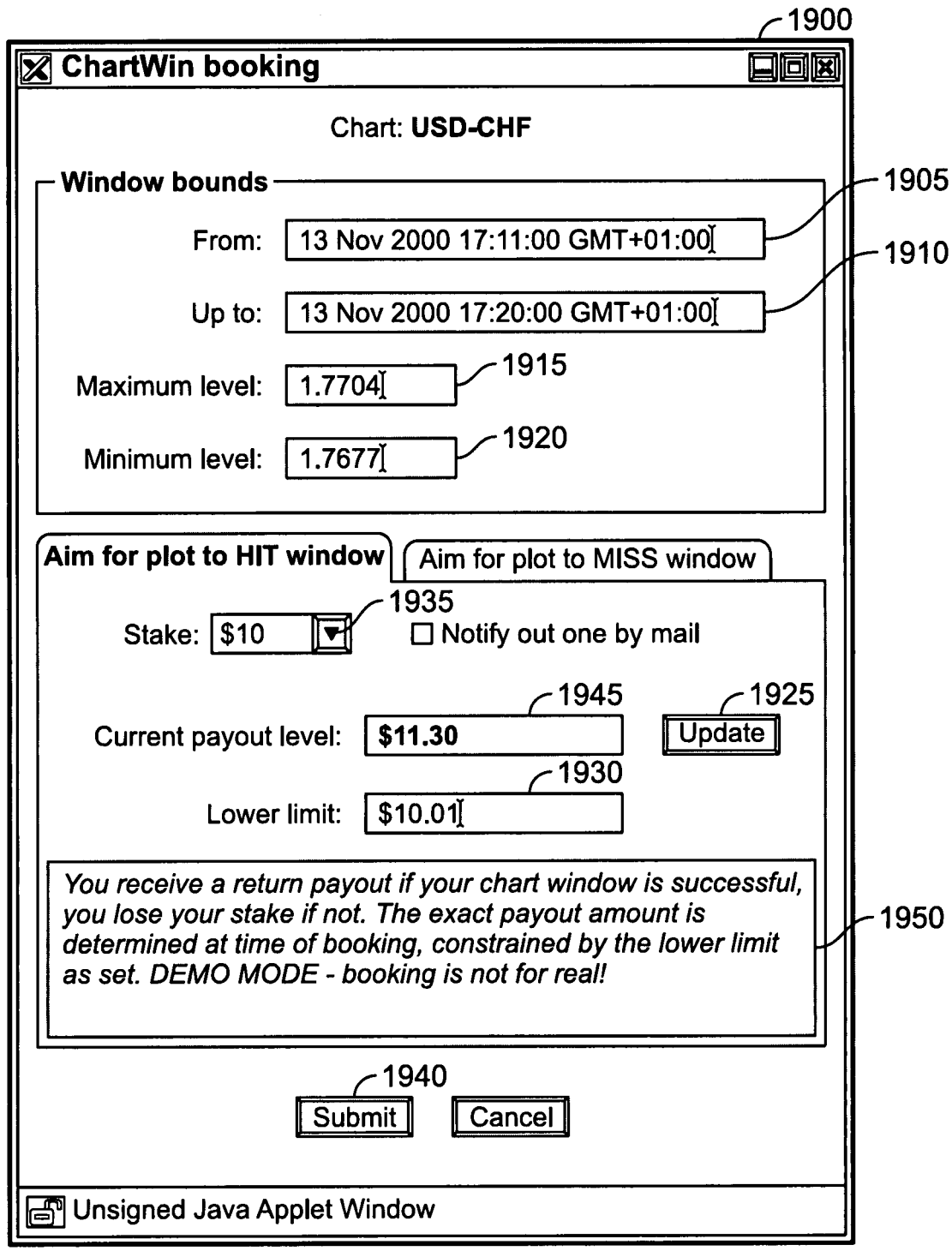
FIG. 19 depicts a dialog window user interface.

The user adjusts the bounds of the box by editing the values shown in a popup dialog window 1900 (see FIG. 19); these adjustments are immediately reflected in the chart display depicted in FIG. 1. The user requests an updated price quote by clicking on an "Update" button 1925 in the dialog window 1900.

Once the user has sized the box as desired (by inputting appropriate values into fields 1905, 1910, 1915, and 1920), input a "stake" in field 1935, and found the displayed price quote ("Current payout level" 1945) attractive, the user clicks a "Submit" button 1940 in the popup dialog which causes the box bounds to be submitted to the Webserver for booking. The actual payout associated with the box is determined at time of booking and not before. The popup dialog window 1900 therefore includes a field 1930 in which the user can specify a lower payout limit. If the payout determined at time of booking is less than the lower limit, the booking is rejected.

The Webserver returns the booking status, indicating whether the booking was accepted or if it failed for any reason. If the booking failed, the reason is reported in the popup dialog window. In this case, the user may make further adjustments to the box or booking terms and attempt to submit the booking again.

Once a transaction has been successfully booked the popup window becomes hidden. The box remains visible in the chart and is from thereon monitored by a backend server. An entry is displayed in the transaction Blotter and the accounting information seen in the Bookkeeper is updated. Test users are not able to book actual transactions—a message box 1950 notifies users when they are in test (demo) mode.

Once the backend server determines the box outcome (either when the chart plot enters the bounds of the box or when the time window elapses), it notifies the Webserver, which in turn delivers the status information to the client through the client's regular update mechanism. A "successful" box is displayed on the chart in green, an "unsuccessful" box in red, and the transaction blotter is updated accordingly.

In addition to the mouse functionality already described, a user can select an existing box by using the mouse to click on it in the chart or on the entry in the Blotter. Context-sensitive buttons below the chart become active, to support the following functionality:

For inactive boxes, the box can be erased from the chart.

For active boxes, a complementing transaction that cancels out the existence of the box can be requested. A popup dialog window appears in which the user is prompted to confirm the transaction.

By keeping the mouse button pressed and dragging the mouse, active boxes may be repositioned, or by clicking the mouse on an edge of an active box and dragging the mouse, the box may be resized. These hybrid transactions involve first canceling the previous box with a complementing transaction and then generating a new transaction for the new bounds. A popup dialog window appears in which the user is prompted to confirm the hybrid transaction after the relevant quotes have been fetched from the Webserver.

Figure 13:
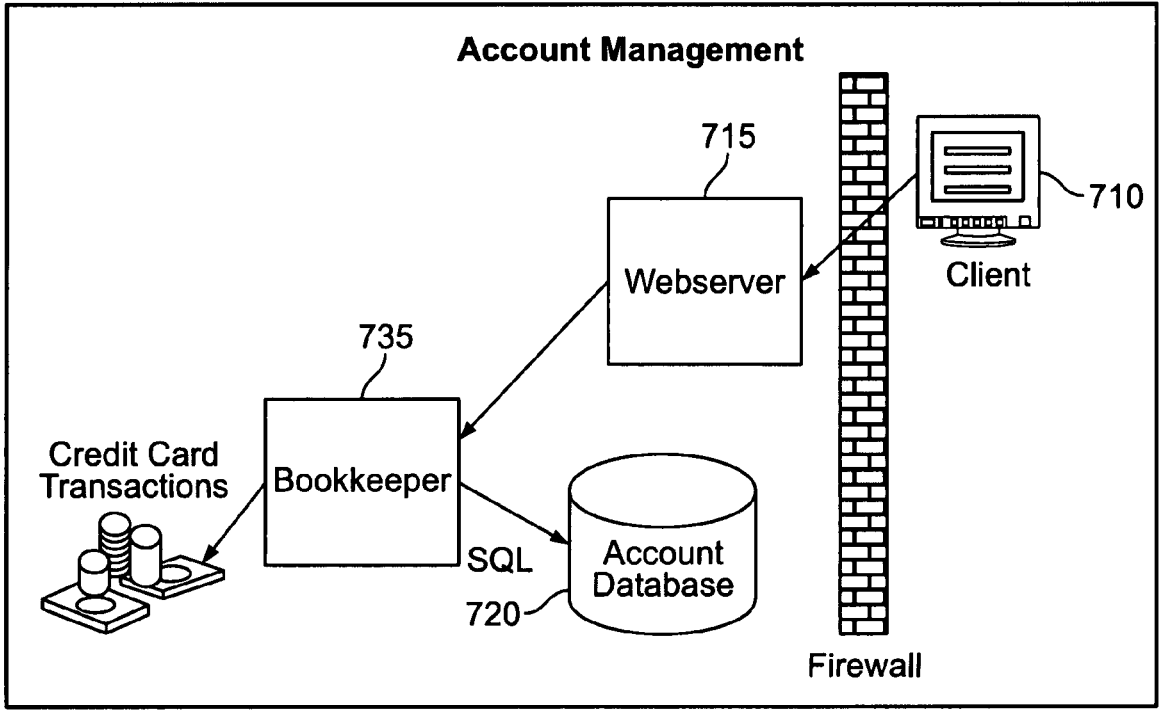
FIG. 13 illustrates account management.

Menu options support settlement of an account balance, allowing the user to pay in or receive pay-out of credit. See FIG. 13.

9.2 Supporting Modules

Figure 7:
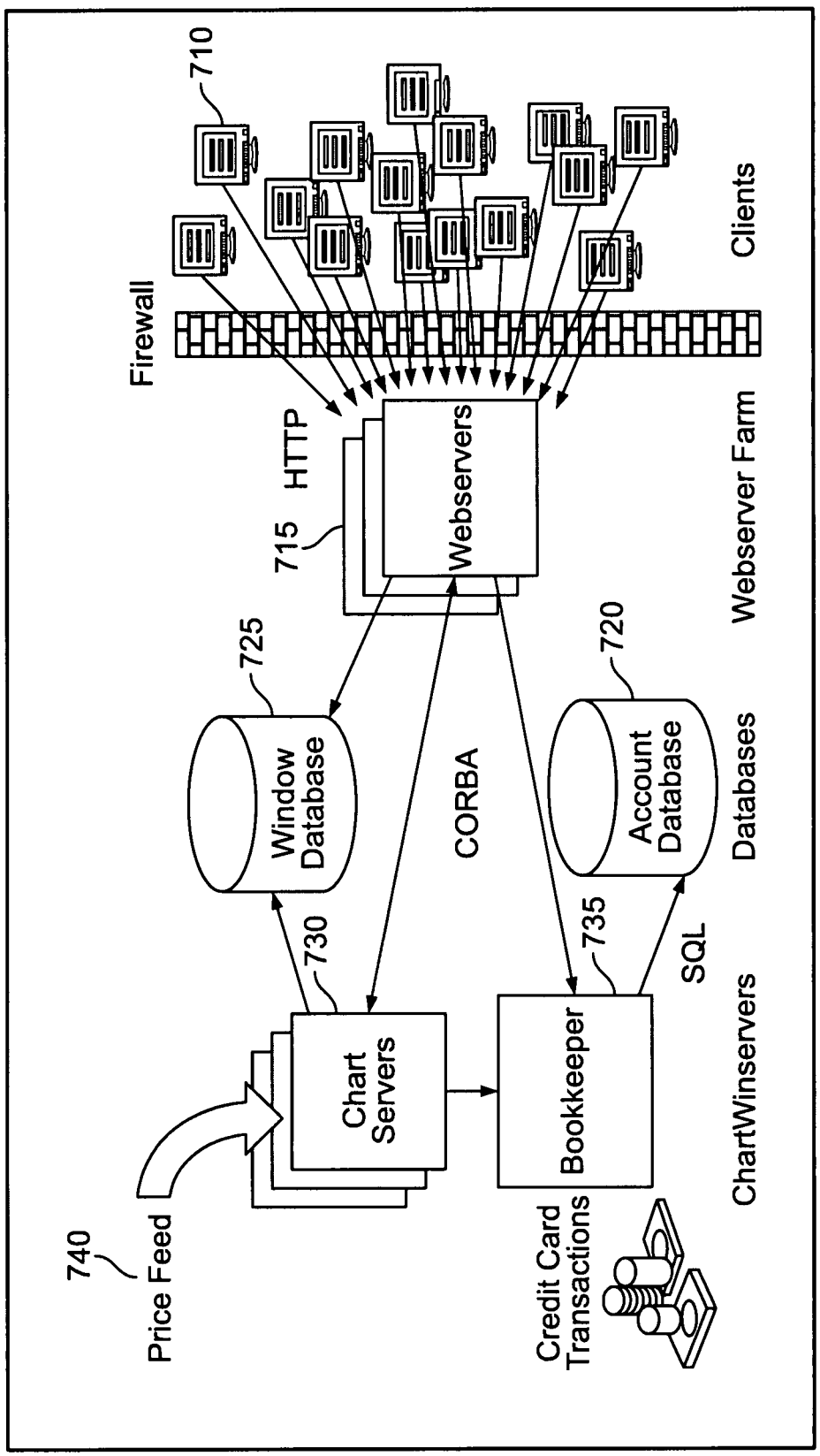
FIG. 7 depicts a system of a preferred embodiment.

FIG. 7 illustrates the back-end modules for supporting the Box Option application as a Web service ("Chart-Win", in a preferred embodiment). The term "CORBA" refers to architecture used in a preferred embodiment. "CORBA" is an acronym for Common Object Request Broker Architecture, which is an architecture that enables pieces of programs, called objects, to communicate with one another regardless of what programming language they were written in or what operating system they are running on.

The roles of the application servers are as follows:

9.2.1 Chart Server

A preferred embodiment has one or more Chart servers 730. Each Chart server 730 preferably has the following functionality: (a) one server (process) per chart; (b) primary recipient of realtime prices; (c) delivers sampled prices to clients (Webservers); (d) computes volatility from incoming prices; (e) computes price quotes on demand; (f) interacts with Bookkeeper 735 for option transactions (the term "window" is occasionally used herein and in the figures as a synonym for "option"); (g) assesses outstanding options for hit or miss; and (h) notifies clients (e.g., Webservers) of option outcomes.

9.2.2 Bookkeeper

A Bookkeeper module 735 preferably has the following functionality: (a) single point of access to customer database; (b) notified of option transactions by Chart server; and (c) user account details checked and updated on transaction confirmation.

9.3 Module Interaction

The underlying back-end mechanisms that operate to support the front-end GUI functionality, as well as user interaction with the front-end GUI functionality, are described below.

FIGS. 14-18 illustrate steps of a preferred process for option creation and pricing. The description below comprises a description of interaction between modules for a user who has started a user application of a preferred embodiment and has a chart (see FIG. 1) in which the user desires to create an option. The option is accepted and tracked until its outcome.

Figure 8:
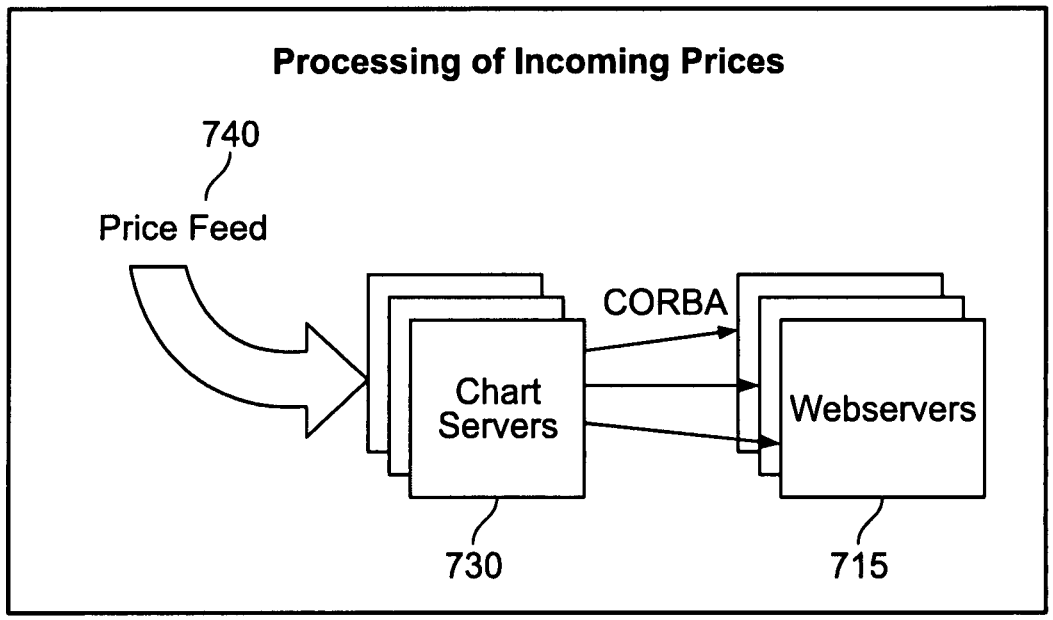
FIG. 8 illustrates processing of incoming prices.
Figure 9:
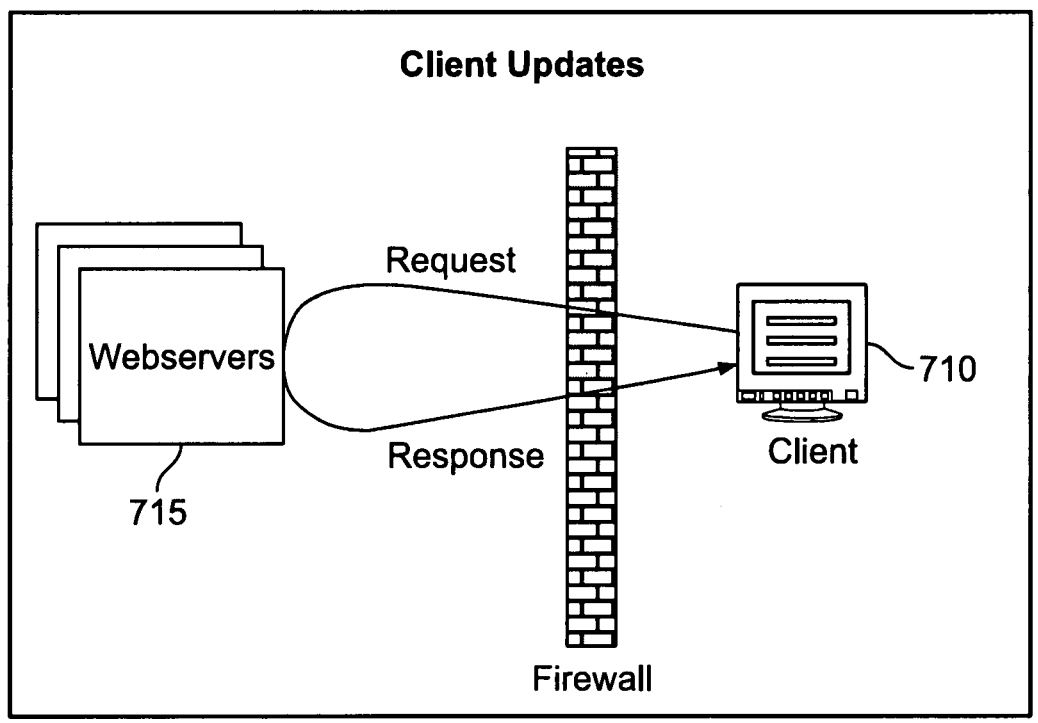
FIG. 9 illustrates client updates.
Figure 14:
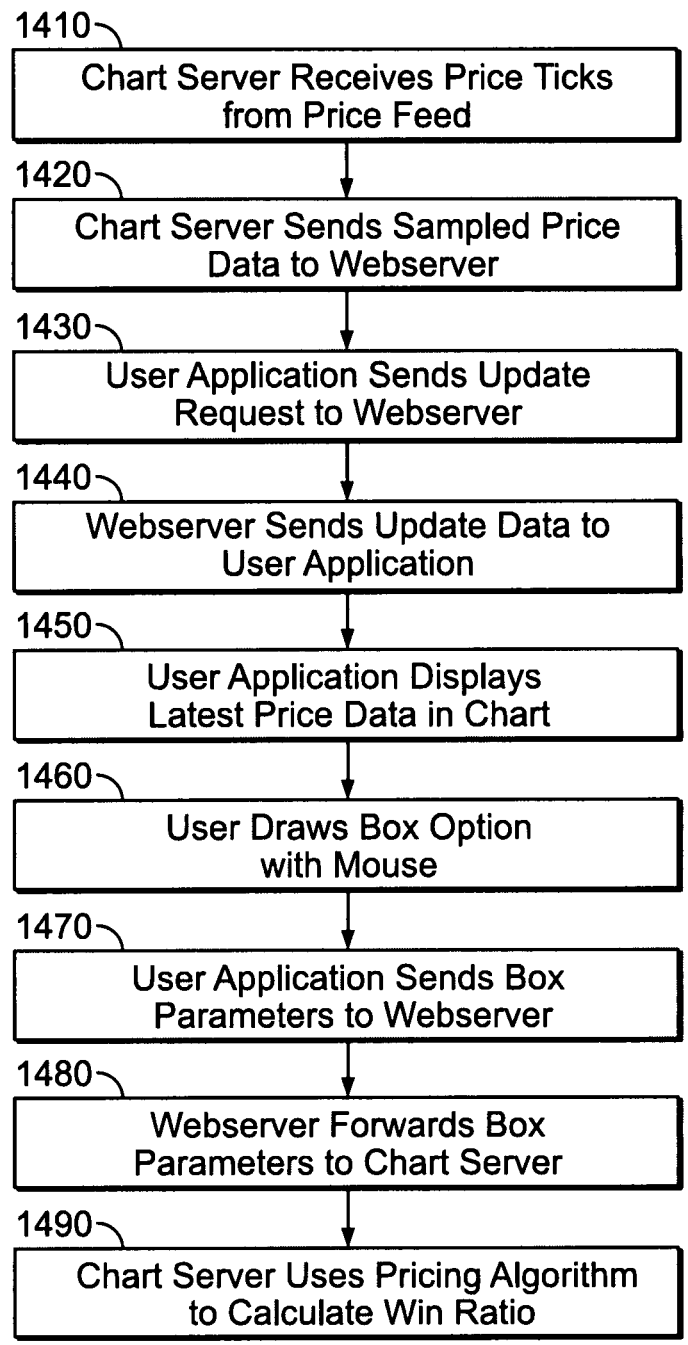
FIGS. 14 through 18 illustrate computer implementation of steps of a preferred embodiment of the subject method.

Referring to FIG. 14, at step 1410 a Chart server 730 (see FIG. 7) receives price ticks from a price feed 740. At step 1420 Chart server 730 sends sampled price data to subscribed clients, such clients including Webservers 715 that are subscribed to Chart server 730 for updates. This process is further illustrated in FIG. 8. At step 1430 a user application residing on a user (client) computer 710 sends an update request to a Webserver 715 via the Internet. At step 1440 Webserver 715 responds to the update request with update data, including the sampled price data received from Chart server 730. At step 1450 the user application receives the update from Webserver 715 and displays the latest price data in the chart (see FIG. 1). This process is further illustrated in FIG. 9.

Figure 10:
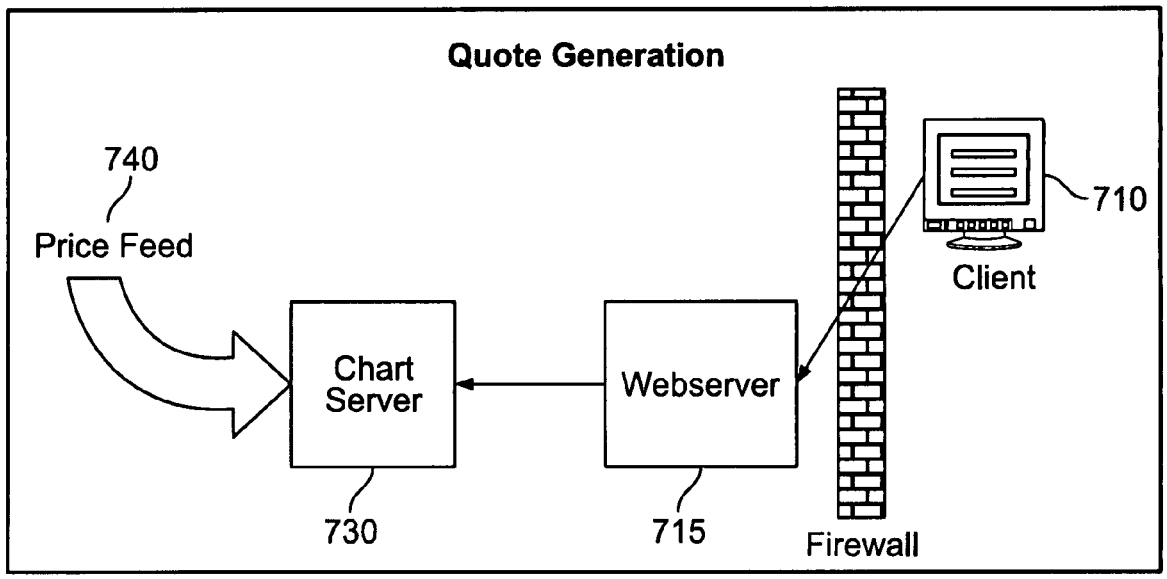
FIG. 10 illustrates quote generation.

At step 1460 the user draws a box option 130 (see FIG. 1) with a mouse. At step 1470 the user application sends the option parameters to Webserver 715 via the Internet. At step 1480 Webserver 715 forwards the received option parameters to Chart server 730. At step 1490 Chart server 730 uses the pricing algorithm described above in Section 7 to calculate a win ratio (ratio of option cost to potential payout). This process is further illustrated in FIG. 10.

Figure 15:
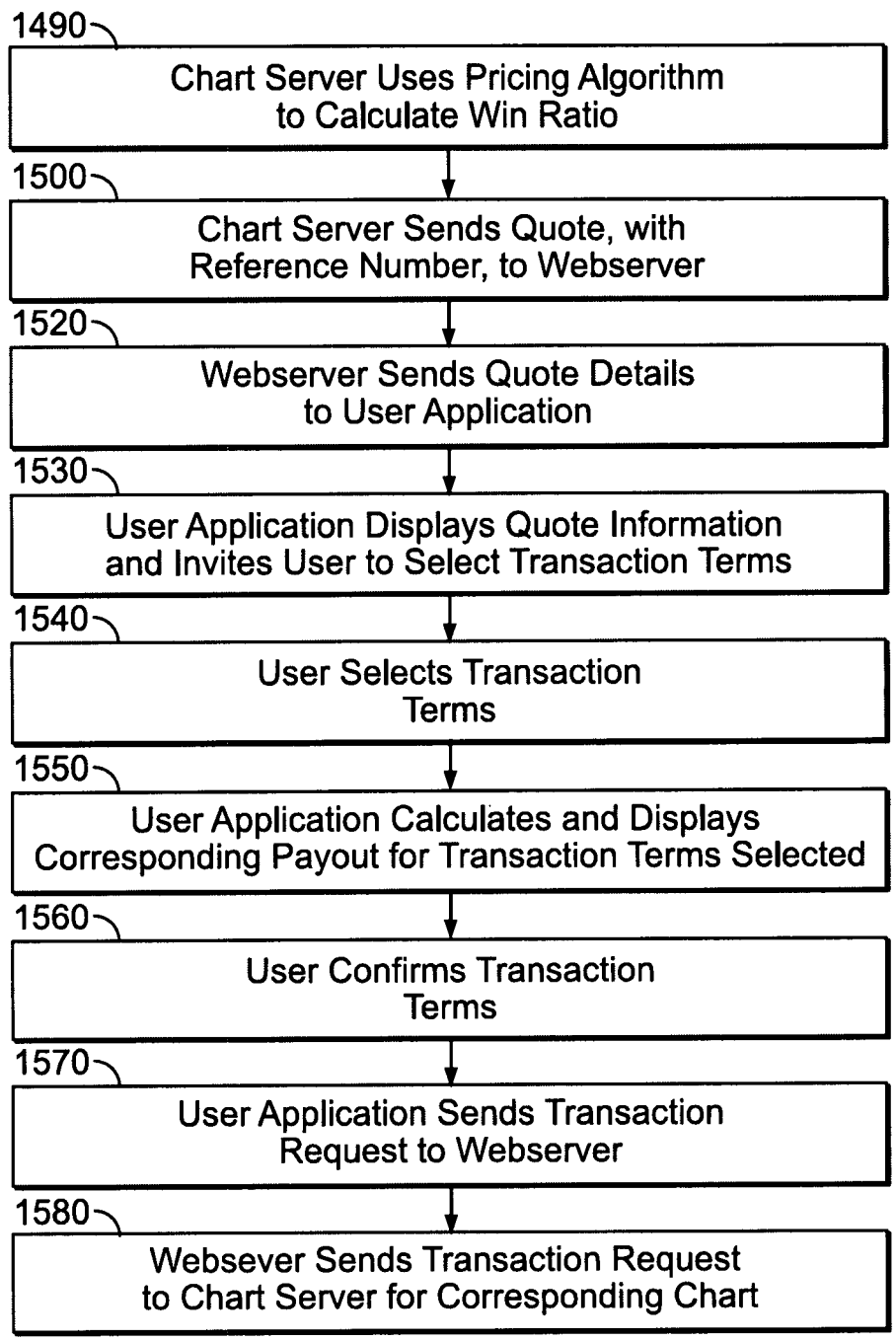

Referring to FIG. 15, at step 1500 Chart server 730 responds to Webserver 715 with a quote (comprising the calculated win ratio). At step 1520 Webserver 715 sends the received quote details to the user application via the Internet. At step 1530 the user application displays received quote information and invites the user to select transaction terms.

At step 1540 the user selects desired transaction terms, including the stake (option price), buy-or-sell, and hit-or-miss. At step 1550 the user application uses the received win ratio to calculate the corresponding payout for the selected transaction terms selected, and displays the payout information. At step 1560 the user confirms the selected transaction terms. At step 1570, the user application sends the user's transaction request to Webserver 715 via the Internet. At step 1580 Webserver 715 sends the received transaction request to Chart server 730.

Figure 16:
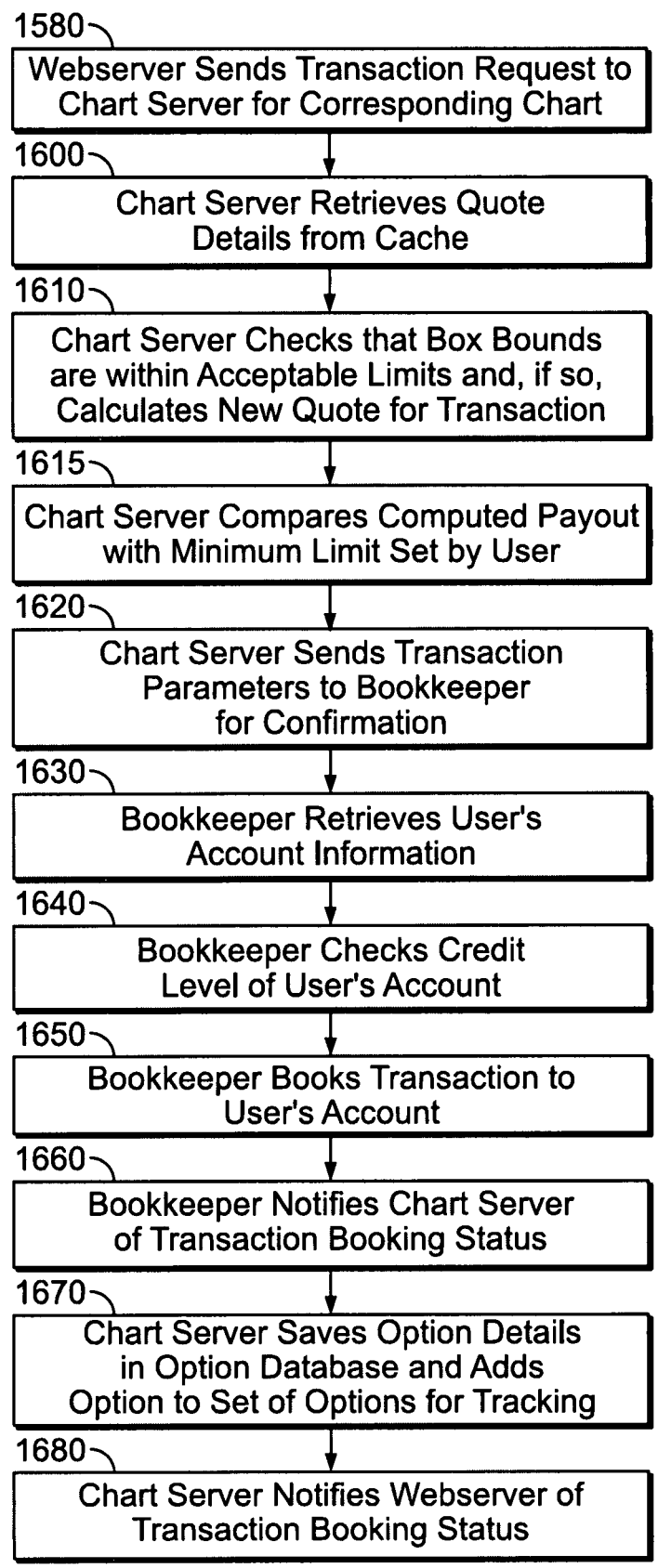

Referring to FIG. 16, at step 1600 Chart server 730 checks that the box bounds are within acceptable limits. At step 1610, if the box bounds are within acceptable limits. Chart server 730 calculates a new quote for the transaction. At step 1615, Chart server 730 compares the computed payout with the minimum limit specified by the user. At step 1620, if the payout is above the user's minimum level, Chart server 730 sends the received user transaction parameters to Bookkeeper 735 for confirmation. At step 1630 Bookkeeper 735 retrieves the user's account information. At step 1640 the Bookkeeper 735 examines the credit level of the user's account. At step 1660, if the credit level for the user's account is satisfactory, Bookkeeper 735 books the transaction to the user's account.

Figure 11:
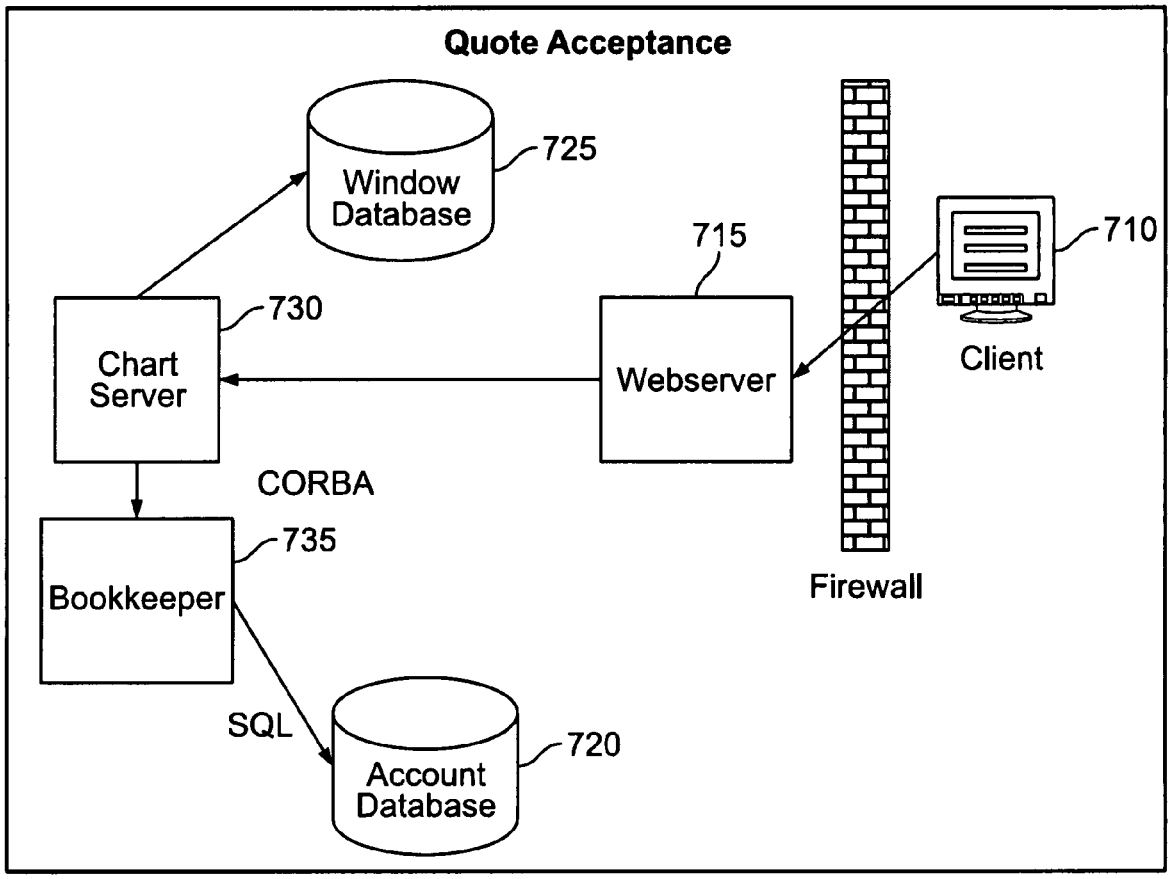
FIG. 11 illustrates quote acceptance.

At step 1660 Bookkeeper 735 responds to Chart server 730 with the transaction booking status. At step 1670, if the transaction was successfully booked, Chart server 730 saves the option details into option database (window database) 725 and adds the option to the set of options for tracking. Steps 1570 through 1670 are further illustrated in FIG. 11.

At step 1680 Chart server 730 notifies Webserver 715 of the transaction booking status. At step 1700 (see FIG. 17), Webserver 715 sends the transaction booking status to the user application via the Internet. The user application then displays transaction parameters 155 (see FIG. 1) comprising Window (i.e., option), Chart (i.e., FX rate), Status, Stake, Payout, etc.

Figure 12:
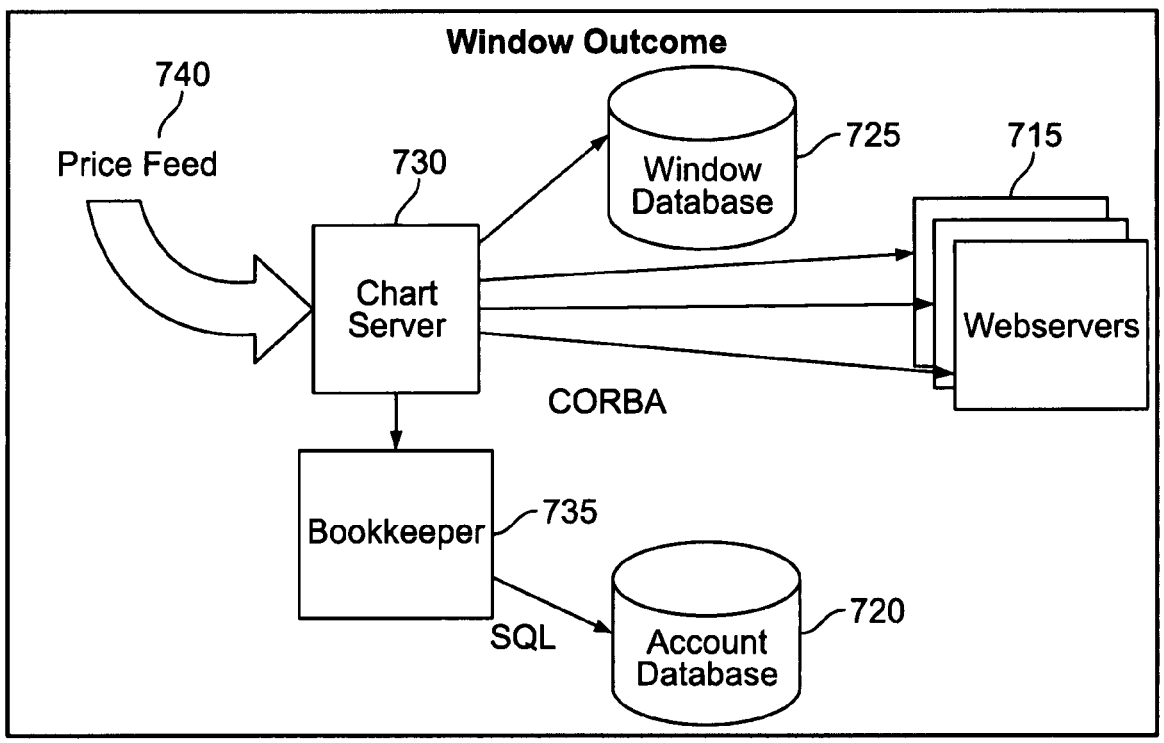
FIG. 12 illustrates window outcome.
Figure 17:
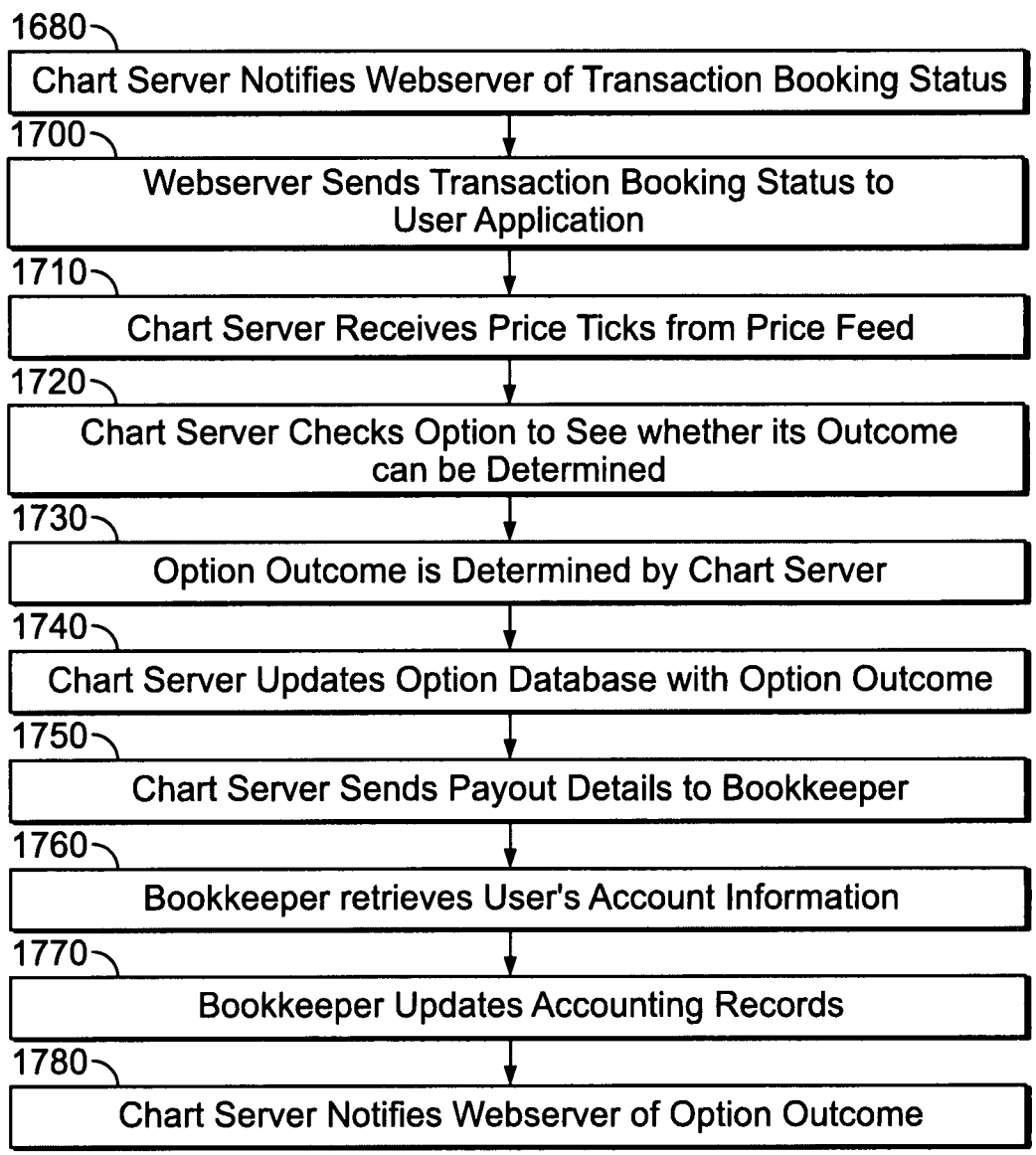

Referring to FIG. 17, at step 1710 Chart server 730 receives price ticks from price feed 740. At step 1720 Chart server 730 checks the option to see whether its outcome can be determined. At step 1730 the outcome of the option is determined by Chart server 730. At step 1740 Chart server 730 updates option database 725 with the option outcome. At step 1750, if a payout for the option is due, Chart server 730 sends the payout details to Bookkeeper 735. At step 1760 the Bookkeeper 735 retrieves the user's account information, and at step 1770 the Bookkeeper updates the accounting records in account database 720. At step 1780 Chart server 730 notifies Webserver 715 of the option outcome. Steps 1710 through 1780 are further illustrated in FIG. 12.

Figure 18:
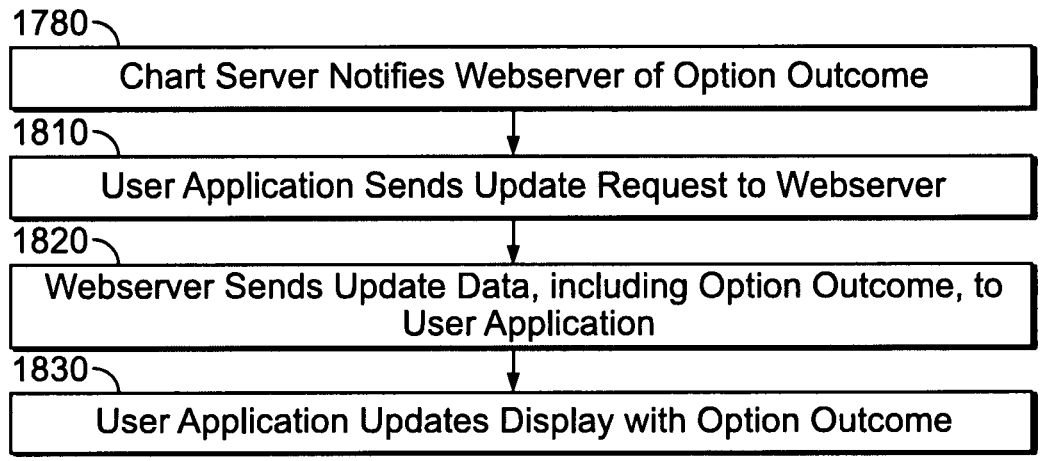

Referring to FIG. 18, at step 1810 the user application sends an update request to Webserver 715 via the Internet. At step 1820 Webserver 715 responds to the received update request by sending update data to the user application. The update data comprises option outcome information. At step 1830 the user application displays the option outcome. This process is further illustrated in FIG. 9.

Other embodiments are within the scope of the following claims. For example, the techniques described herein are not limited to any particular hardware or software configuration. They may be applied in any computing or processing environment that may be used for data storage, transmission, and display. Preferably, the techniques are implemented in computer programs executing on programmable computers that each include a processor, at least one input device, and at least one output device.

What is claimed is:

1. A method of option creation for an asset that has a value that varies over time, comprising the steps of:
   (a) viewing on a computer screen connected to a computer a graphical display that shows the values of the asset over time;
   (b) entering into the computer a selection of asset values in a future time period by drawing a zone on the graphical display, wherein said zone is located in an area of the display that corresponds to asset values in a future time period and wherein the asset values and time period encompassed by said zone represent a proposed option on the asset;
   (c) receiving a price quote for the proposed option computed using the asset values and time period entered into the computer by drawing the zone; and
   (d) specifying a stake for said option.

2. The method of claim 1, wherein said zone is rectangular.

3. The method of claim 1, wherein said graphical display comprises a display of prices versus time.

4. The method of claim 1, wherein said asset is a currency.

5. The method of claim 1 wherein the price quote is expressed as a win ratio.

6. A method of option creation and pricing for an asset that has a value that varies over time, comprising the steps of:
   (a) receiving data representing values of the asset over time;
   (b) storing said data in a computer-readable medium;
   (c) transmitting data representing the values of the asset over time to a Computer screen;
   (d) receiving from said computer screen parameters of a proposed option on the asset at a future time, said parameters having been input on the display screen using a zone that is drawn on the computer screen;
   (e) calculating a price quote for the proposed option using said parameters of the proposed option;
   (f) transmitting said price quote to a prospective purchaser of the option; and
   (g) receiving from said purchaser an order for the option.

7. The method of claim 6 wherein the zone is rectangular.

8. The method of claim 7, wherein said proposed option is a box option.

9. The method of claim 8, wherein said parameters of said proposed option comprise a start time, an end time, an upper limit, and a lower limit.

10. The method of claim 7 wherein the price quote is expressed as a win ratio.

11. A method of option creation for an asset that has a value that varies over time, comprising the steps of:
    (a) viewing on a computer screen connected to a computer a graphical display that plots price on a first axis and time on a second axis;
    (b) entering into the computer a selection of asset values in a future time period by using a mouse to draw a zone on the graphical display, wherein said zone is located in an area of the display that corresponds to asset values in a future time period and wherein the asset values and time period encompassed by said zone represent a proposed option on the asset;
    (c) receiving a price quote for the proposed option computed using the asset values and time period entered into the computer by drawing the zone; and
    (d) specifying a stake for said option.

12. The method of claim 11 wherein the zone is rectangular.

13. A method of option creation for an asset that has a value that varies over time, comprising the steps of:
    (a) viewing on a computer screen connected to a computer a graphical display that plots price on a first axis and time on a second axis;
    (b) entering into the computer a selection of asset values in a future time period by using a mouse to draw a zone on the graphical display, wherein said zone is located in an area of the display that corresponds to asset values in a future time period and wherein the asset values and time period encompassed by said zone represent a proposed option on the asset;
    (c) computing a price quote for the proposed option using the asset values and time period entered into the computer by drawing the zone; and
    (d) specifying a stake for said option.

14. The method of claim 13 wherein the zone is rectangular.

15. A method of option creation and pricing for an asset that has a value that varies over time, comprising the steps of:
- (a) receiving data representing values of the asset over time;
- (b) storing said data in a computer-readable medium;
- (c) generating on a computer screen connected to a computer a graphical display that plots price on a first axis and time on a second axis;
- (d) receiving from said computer screen parameters of a proposed option on the asset at a future time, said parameters having been input on the screen using a zone that is drawn on the computer screen using a mouse;
- (e) calculating a price quote for the proposed option using said parameters of the proposed option;
- (f) transmitting said price quote to a prospective purchaser of the option; and
- (g) receiving from said purchaser an order for the option.

16. The method of claim 15 wherein the zone is rectangular.

* * * * *